(12) United States Patent
Hsu et al.

(10) Patent No.: US 8,830,594 B1
(45) Date of Patent: Sep. 9, 2014

(54) IMAGING LENS ASSEMBLY

(71) Applicant: Largan Precision Co., Ltd., Taichung (TW)

(72) Inventors: Po-Lun Hsu, Taichung (TW); Hsiang-Chi Tang, Taichung (TW); Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 40 days.

(21) Appl. No.: 13/854,128

(22) Filed: Mar. 31, 2013

(30) Foreign Application Priority Data

Feb. 25, 2013 (TW) .............................. 102106527 U

(51) Int. Cl.
*G02B 9/62* (2006.01)
*G02B 13/00* (2006.01)

(52) U.S. Cl.
CPC .............. *G02B 13/0045* (2013.01); *G02B 9/62* (2013.01)
USPC .......................................... 359/713; 359/757

(58) Field of Classification Search
CPC .............................. G02B 9/62; G02B 13/0045
USPC .................. 359/708, 713, 754, 755–757, 759
See application file for complete search history.

(56) References Cited

U.S. PATENT DOCUMENTS

| | | | |
|---|---|---|---|
| 7,869,142 B2 | 1/2011 | Chen et al. | |
| 8,000,031 B1 | 8/2011 | Tsai | |
| 2012/0206822 A1 | 8/2012 | Hsieh et al. | |
| 2012/0243108 A1* | 9/2012 | Tsai et al. | 359/713 |
| 2013/0003193 A1* | 1/2013 | Huang | 359/713 |
| 2013/0070346 A1* | 3/2013 | Hsu et al. | 359/713 |
| 2013/0235473 A1* | 9/2013 | Chen et al. | 359/713 |
| 2013/0279021 A1* | 10/2013 | Chen et al. | 359/713 |
| 2013/0314804 A1* | 11/2013 | Kubota et al. | 359/757 |
| 2013/0329306 A1* | 12/2013 | Tsai et al. | 359/713 |
| 2013/0335833 A1* | 12/2013 | Liao et al. | 359/713 |
| 2013/0335834 A1* | 12/2013 | Tsai et al. | 359/713 |

* cited by examiner

*Primary Examiner* — Darryl J Collins
(74) *Attorney, Agent, or Firm* — CKC & Partners Co., Ltd.

(57) ABSTRACT

An imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element with negative refractive power has a concave object-side surface and a convex image-side surface. The fifth lens element with positive refractive power has a convex object-side surface, wherein the surfaces thereof are aspheric. The sixth lens element with refractive power has a convex object-side surface and a concave image-side surface, wherein the surfaces thereof are aspheric, and the sixth lens element has at least one inflection point on at least one of the surfaces thereof.

22 Claims, 27 Drawing Sheets

IMAGING LENS ASSEMBLY

RELATED APPLICATIONS

The application claims priority to Taiwan Application Serial Number 102106527, filed Feb. 25, 2013, which is herein incorporated by reference.

BACKGROUND

1. Technical Field

The present invention relates to an imaging lens assembly. More to particularly, the present invention relates to a compact imaging lens assembly applicable to electronic products.

2. Description of Related Art

In recent years, with the popularity of mobile products having camera functionalities, the demand of miniaturized optical lens systems has been increasing. The sensor of a conventional optical lens system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional optical lens system employed in a portable electronic product mainly adopts a four-element lens structure or a five-element lens structure such as the ones disclosed in the U.S. Pat. No. 7,869,142 and the U.S. Pat. No. 8,000,031. Due to the popularity of mobile products with high-end specifications, such as smart phones and PDAs (Personal Digital Assistants), the requirements for high resolution and image quality of present compact optical lens systems increase significantly. However, the conventional optical lens system cannot satisfy these requirements of the compact optical lens systems.

Other conventional compact optical lens systems with six-element lens structure such as the one disclosed in the U.S. Publication No. 2012/0206822 A1 enhance image quality and resolution. However, the shape of the surfaces of the fifth lens element cannot effectively control the angle at which the incident light projects onto an image sensor from every field, so that the vignetting is generated on the peripheral region of the image and the image quality is decreased. Furthermore, the size of the optical lens system cannot be effectively reduced, and cannot be applied to the portable assembly.

SUMMARY

According to one aspect of the present disclosure, an imaging lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element with negative refractive power has a concave object-side surface and a convex image-side surface. The fifth lens element with positive refractive power has a convex object-side surface, wherein the object-side surface and an image-side surface of the fifth lens element are aspheric. The sixth lens element with refractive power has a convex object-side surface and a concave image-side surface, wherein the object-side surface and the image-side surface of the sixth lens element are aspheric, and the sixth lens element has at least one inflection point on at least one of the object-side surface and the image-side surface thereof. The imaging lens assembly has a total of six lens elements with refractive power. When a curvature radius of the object-side surface of the fifth lens element is R9, a curvature radius of the image-side surface of the fifth lens element is R10, an axial distance between the fifth lens element and the sixth lens element is T56, a central thickness of the fifth lens element is CT5, and a central thickness of the sixth lens element is CT6, the following relationships are satisfied:

$$-3.0 < (R9+R10)/(R9-R10) < 0.30; \text{ and}$$

$$0 < (T56+CT6)/CT5 < 3.0.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
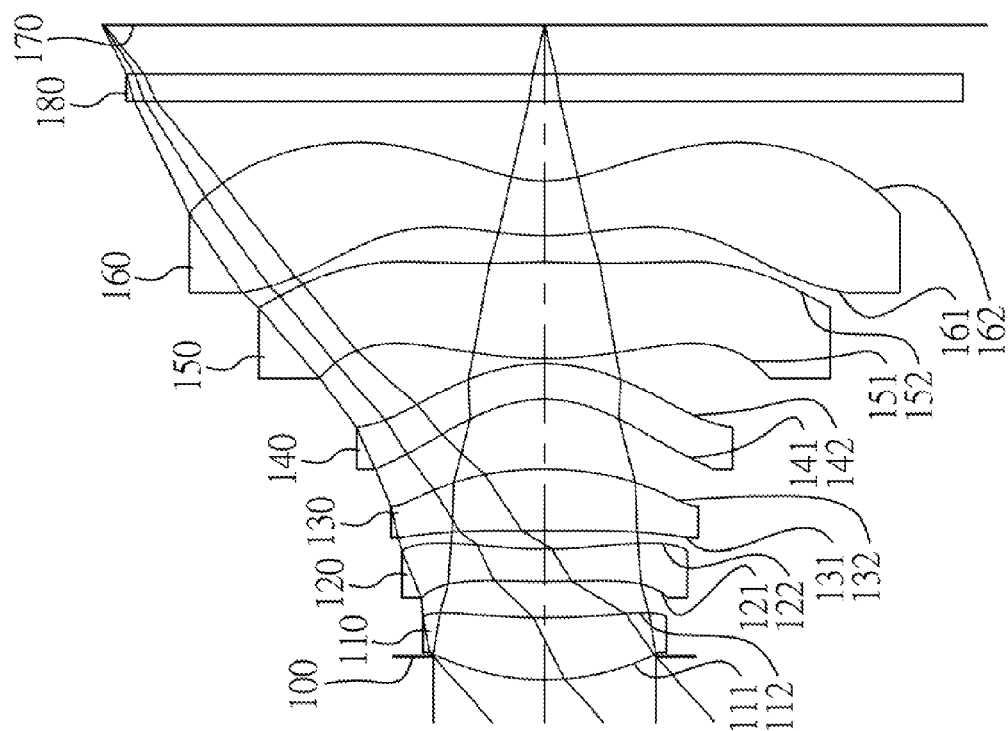
FIG. 1 is a schematic view of an imaging lens assembly according to the 1st embodiment of the present disclosure.

An imaging lens assembly includes, in order from an object side to an image side, a first lens element, a second lens element, a third lens element, a fourth lens element, a fifth lens element and a sixth lens element. The imaging lens assembly has a total of six lens elements with refractive power.

The first lens element with positive refractive power has a convex object-side surface, and can have a concave image-side surface. Therefore, the total track length of the imaging lens assembly can be reduced by properly adjusting the positive refractive power of the first lens element.

The second lens element can have a convex object-side surface and a concave image-side surface, so that the astigmatism can be corrected by proper the curvatures of the surfaces thereof.

The third lens element with positive refractive power can have a convex image-side surface. Therefore, the distribution of the positive refractive power of the first lens element can be balanced for avoiding the excessive spherical aberration and reducing the photosensitivity of the imaging lens assembly.

The fourth lens element with negative refractive power has a concave object-side surface and a convex image-side surface. Therefore, the Petzval sum and the astigmatism of the imaging lens assembly can be corrected effectively, so that the image would be sharper.

The fifth lens element with positive refractive power has a convex object-side surface, wherein the object-side surface of the fifth lens element changes from convex at a paraxial region thereof to concave at a peripheral region thereof. Therefore, the spherical aberration can be improved, and the coma aberration and the astigmatism from the off-axis field can be corrected.

The sixth lens element has a convex object-side surface and a concave image-side surface. Therefore, the principal point of the imaging lens assembly can be positioned away from the image plane, and the back focal length thereof can be reduced so as to keep the imaging lens assembly compact. Furthermore, the sixth lens element has at least one inflection point on at least one of the object-side surface and the image-side surface thereof. It is favorable for effectively reducing the angle at which the incident light projects onto an image sensor from the off-axis field so as to correct the off-axis aberration.

When a curvature radius of the object-side surface of the fifth lens element is R9, and a curvature radius of the image-side surface of the fifth lens element is R10, the following relationship is satisfied: $-3.0<(R9+R10)/(R9-R10)<0.30$. Therefore, the angle at which the incident light projects onto an image sensor from the peripheral field can be effectively reduced, so that the vignetting on the peripheral region of the image generated from the larger field of view can be reduced. Preferably, the following relationship is satisfied: $-2.5<(R9+R10)/(R9-R10)<0$.

When an axial distance between the fifth lens element and the sixth lens element is T56, a central thickness of the fifth lens element is CT5, and a central thickness of the sixth lens element is CT6, the following relationship is satisfied: $0<(T56+CT6)/CT5<3.0$. Therefore, the close arrangement of the lens elements can reduce the total track length so as to maintain the compact size of the imaging lens assembly. Preferably, the following relationship is satisfied: $0.3<(T56+CT6)/CT5<2.0$. More preferably, the following relationship is satisfied: $0.5<(T56+CT6)/CT5<1.7$.

When a focal length of the imaging lens assembly is f, and a focal length of the sixth lens element is f6, the following relationship is satisfied: $-0.7<f/f6<0.5$. Therefore, the principal point of the imaging lens assembly can be positioned away from the image plane, and the back focal length of the imaging lens assembly can be reduced so as to keep the compact size thereof. Furthermore, the photosensitivity of the imaging lens assembly can be also reduced.

When an f-number of the imaging lens assembly is Fno, the following relationship is satisfied: $1.2<Fno<2.5$. It is favorable for obtaining the large aperture characteristic by properly adjusting the f-number, so that the clear image can be captured by higher shutter speed in low light.

When a maximum effective radius of the object-side surface of the first lens element is SD11, and a maximum effective radius of the image-side surface of the sixth lens element is SD62, the following relationship is satisfied: $0.20<SD11/SD62<0.45$. It is favorable for effectively reducing the angle at which the incident light projects onto an image sensor so as to correct the off-axis aberration.

When a focal length of the first lens element is f1, and a focal length of the third lens element is f3, the following relationship is satisfied: $0<f3/f1<1.0$. Therefore, the positive refractive power of the first lens element can be properly distributed so as to avoid the excessive spherical aberration.

When an Abbe number of the second lens element is V2, an Abbe number of the fourth lens element is V4, and an Abbe number of the sixth lens element is V6, the following relationship is satisfied: $0.70<(V2+V4)/V6<1.00$. Therefore, the chromatic aberration of the imaging lens assembly can be corrected.

When a half of a maximal field of view of the imaging lens assembly is HFOV, the following relationship is satisfied: 35 degrees<HFOV<50 degrees. In order to avoid the distortion of the peripheral region of the image under larger field of view or the restriction of the capturing range under insufficient field of view, the field of view of the imaging lens assembly is proper for capturing the proper range and providing high image quality.

When a curvature radius of the object-side surface of the third lens element is R5, and a curvature radius of the image-side surface of the third lens element is R6, the following relationship is satisfied: $0.6<(R5+R6)/(R5-R6)<1.5$. Therefore, the spherical aberration and the photosensitivity of the imaging lens assembly can be reduced.

When a central thickness of the second lens element is CT2, and an axial distance between the first lens element and the second lens element is T12, the following relationship is satisfied: $0.4<CT2/T12<2.0$. It is favorable for manufacturing and assembling the lens elements so as to maintain the compact size of the imaging lens assembly.

When the focal length of the imaging lens assembly is f, and the focal length of the third lens element is f3, the following relationship is satisfied: 0.8<f/f3<1.5. Therefore, the spherical aberration of the imaging lens assembly can be corrected.

When a vertical distance between a non-axial critical point on the object-side surface of the fifth lens element and an optical axis is Yc51, and a vertical distance between a non-axial critical point on the image-side surface of the sixth lens element and the optical axis is Yc62, the following relationship is satisfied: 0.5<Yc51/Yc62<1.1. Therefore, the aberration from the off-axis field can be effectively corrected.

When a sum of central thicknesses of the first lens element, the second lens element, the third lens element, the fourth lens element, the fifth lens element and the sixth lens element is ΣCT, and an axial distance between the object-side surface of the first lens element and the image-side surface of the sixth lens element is TD, the following relationship is satisfied: 0.75<ΣCT/TD<0.90. Therefore, the thicknesses of the lens elements and the distance between the lens elements are proper so as to assemble the mechanism for fasten or position the lens elements.

When an axial distance between the object-side surface of the first lens element and the image plane is TL, the following relationship is satisfied: 3.0 mm<TL<5.0 mm. It is favorable for maintain the compact size of the imaging lens assembly.

According to the imaging lens assembly of the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing the imaging lens assembly. The total track length of the imaging lens assembly can thereby be reduced.

According to the imaging lens assembly of the present disclosure, when the lens element has a convex surface, it indicates that the surface is convex at the paraxial region; and when the lens element has a concave surface, it indicates that the surface is concave at the paraxial region.

According to the imaging lens assembly of the present disclosure, there can be at least one stop provided, such as an aperture stop, a glare stop, or a field stop. Said glare stop or said field stop is allocated for reducing the stray light and thereby improving the image resolution thereof.

Furthermore, an aperture stop can be configured as a front stop or a middle stop. A front stop disposed between the object and the first lens element can provide a longer distance from an exit pupil of the system to an image plane and thereby the generated telecentric effect improves the image-sensing efficiency of an image sensor. A middle stop disposed between the first lens element and the image plane is favorable for enlarging the field of view of the system and thereby provides a wider field of view for the same.

According to the imaging lens assembly of the present disclosure, a critical point is a non-axial point of the lens surface where its tangent is perpendicular to the optical axis.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the above description of the present disclosure, the following 1st-13th specific embodiments are provided for further explanation.

1st Embodiment

Figure 2:
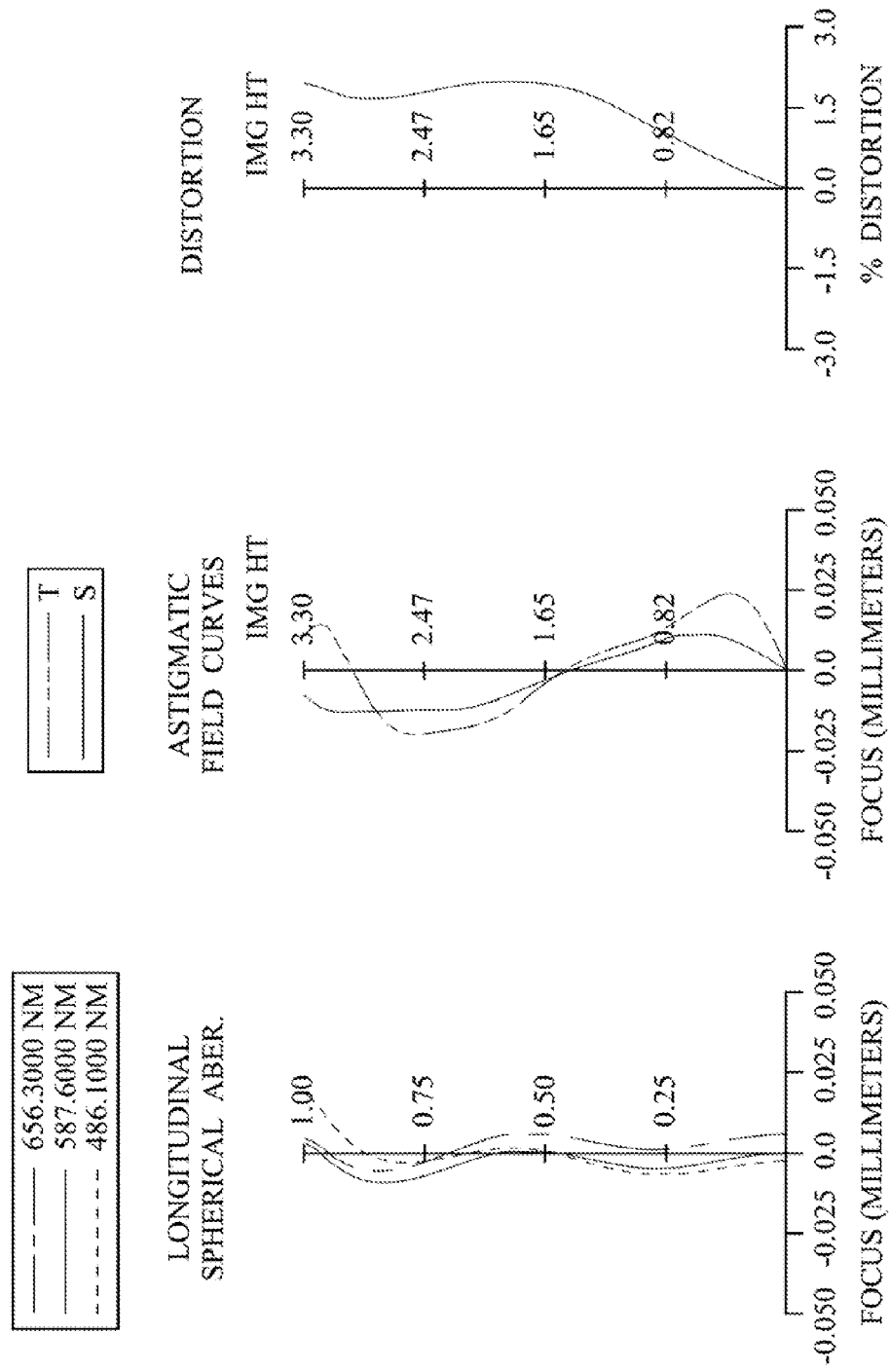
FIG. 2 shows spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows spherical aberration curves, astigmatic field curves and a distortion curve of the imaging lens assembly according to the 1st embodiment. In FIG. 1, the imaging lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180 and an image plane 170, wherein the imaging lens assembly has a total of six lens elements with refractive power.

The first lens element 110 with positive refractive power has a convex object-side surface 111 and a concave image-side surface 112. The first lens element 110 is made of plastic material, and has the object-side surface 111 and the image-side surface 112 being both aspheric.

The second lens element 120 with negative refractive power has a convex object-side surface 121 and a concave image-side surface 122. The second lens element 120 is made of plastic material, and has the object-side surface 121 and the image-side surface 122 being both aspheric.

The third lens element 130 with positive refractive power has a convex object-side surface 131 and a convex image-side surface 132. The third lens element 130 is made of plastic material, and has the object-side surface 131 and the image-side surface 132 being both aspheric.

The fourth lens element 140 with negative refractive power has a concave object-side surface 141 and a convex image-side surface 142. The fourth lens element 140 is made of plastic material, and has the object-side surface 141 and the image-side surface 142 being both aspheric.

The fifth lens element 150 with positive refractive power has a convex object-side surface 151 and a convex image-side surface 152, wherein the object-side surface 151 of the fifth lens element 150 changes from convex at a paraxial region thereof to concave at a peripheral region thereof. The fifth lens element 150 is made of plastic material, and has the object-side surface 151 and the image-side surface 152 being both aspheric.

The sixth lens element 160 with negative refractive power has a convex object-side surface 161 and a concave image-side surface 162. The sixth lens element 160 is made of plastic material, and has the object-side surface 161 and the image-side surface 162 being both aspheric. Furthermore, the sixth lens element 160 has inflection points on the object-side surface 161 and the image-side surface 162 thereof.

The IR-cut filter 180 is made of glass material and located between the sixth lens element 160 and the image plane 170, and will not affect the focal length of the imaging lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

Wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=3.66 mm; Fno=2.20; and HFOV=41.5 degrees.

In the imaging lens assembly according to the 1st embodiment, when an Abbe number of the second lens element 120 is V2, an Abbe number of the fourth lens element 140 is V4, and an Abbe number of the sixth lens element 160 is V6, the following relationship is satisfied: (V2+V4)/V6=0.77.

In the imaging lens assembly according to the 1st embodiment, when a central thickness of the second lens element 120 is CT2, an axial distance between the first lens element 110 and the second lens element 120 is T12, an axial distance between the fifth lens element 150 and the sixth lens element 160 is T56, a central thickness of the fifth lens element 150 is CT5, and a central thickness of the sixth lens element 160 is CT6, the following relationships are satisfied: CT2/T12=0.89; and (T56+CT6)/CT5=0.84.

In the imaging lens assembly according to the 1st embodiment, when a curvature radius of the object-side surface 131 of the third lens element 130 is R5, a curvature radius of the image-side surface 132 of the third lens element 130 is R6, a curvature radius of the object-side surface 151 of the fifth lens element 150 is R9, a curvature radius of the image-side surface 152 of the fifth lens element 150 is R10, and the following relationships are satisfied:

(R5+R6)/(R5−R6)=0.93; and (R9+R10)/(R9−R10)=−0.48.

In the imaging lens assembly according to the 1st embodiment, when the focal length of the imaging lens assembly is f, a focal length of the first lens element 110 is f1, a focal length of the third lens element 130 is f3, and a focal length of the sixth lens element 160 is f6, the following relationships are satisfied: f/f3=0.83; f/f6=−0.90; and f3/f1=0.91.

In the imaging lens assembly according to the 1st embodiment, when a sum of central thicknesses of the first lens element 110, the second lens element 120, the third lens element 130, the fourth lens element 140, the fifth lens element 150 and the sixth lens element 160 is ΣCT, and an axial distance between the object-side surface 111 of the first lens element 110 and the image-side surface 162 of the sixth lens element 160 is TD, the following relationship is satisfied: ΣCT/TD=0.69.

In the imaging lens assembly according to the 1st embodiment, when a maximum effective radius of the object-side surface 111 of the first lens element 110 is SD11, and a maximum effective radius of the image-side surface 162 of the sixth lens element 160 is SD62, the following relationship is satisfied:

SD11/SD62=0.32.

Figure 27:
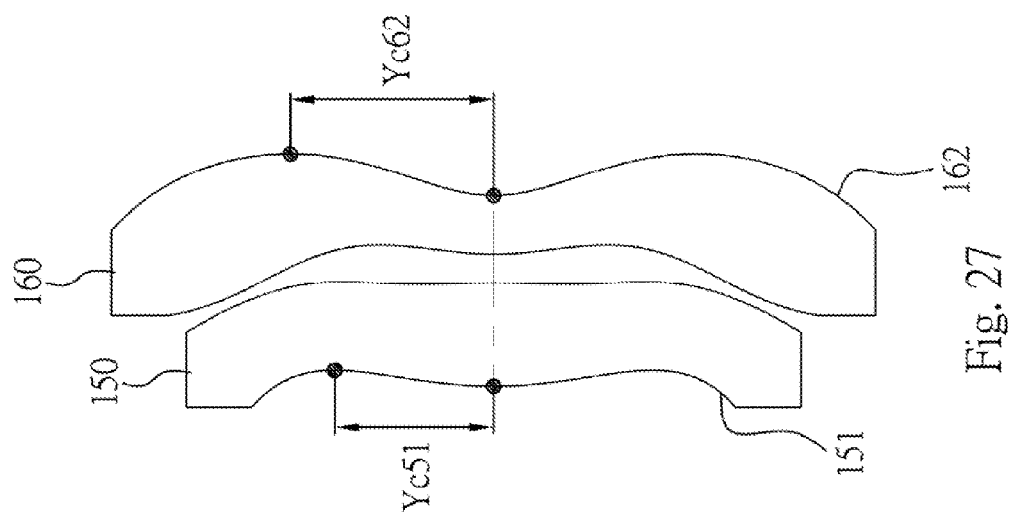
FIG. 27 shows Yc51 and Yc62 of the fifth lens element and the sixth lens element of the imaging lens assembly of FIG. 1.

FIG. 27 shows Yc51 and Yc62 of the fifth lens element 150 and the sixth lens element 160 of the imaging lens assembly of FIG. 1. When a vertical distance between a non-axial critical point on the object-side surface 151 of the fifth lens element 150 and an optical axis is Yc51, and a vertical distance between a non-axial critical point on the image-side surface 162 of the sixth lens element 160 and the optical axis is Yc62, the following relationship is satisfied: Yc51/Yc62=0.78.

In the imaging lens assembly according to the 1st embodiment, when an axial distance between the object-side surface 111 of the first lens element 110 and the image plane 170 is TL, the following relationship is satisfied: TL=4.90 mm.

The detailed optical data of the 1st embodiment are shown in Table 1 and the aspheric surface data are shown in Table 2 below.

TABLE 1

1st Embodiment
f = 3.66 mm, Fno = 2.20, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.176 | | | | |
| 2 | Lens 1 | 1.873 | ASP | 0.466 | Plastic | 1.570 | 54.5 | 4.83 |
| 3 | | 5.320 | ASP | 0.270 | | | | |
| 4 | Lens 2 | 8.099 | ASP | 0.240 | Plastic | 1.650 | 21.4 | −9.07 |
| 5 | | 3.372 | ASP | 0.135 | | | | |
| 6 | Lens 3 | 73.054 | ASP | 0.466 | Plastic | 1.570 | 54.5 | 4.39 |
| 7 | | −2.586 | ASP | 0.521 | | | | |
| 8 | Lens 4 | −0.940 | ASP | 0.270 | Plastic | 1.650 | 21.4 | −6.53 |
| 9 | | −1.344 | ASP | 0.038 | | | | |
| 10 | Lens 5 | 2.814 | ASP | 0.719 | Plastic | 1.535 | 55.7 | 3.99 |
| 11 | | −8.036 | ASP | 0.200 | | | | |
| 12 | Lens 6 | 1.904 | ASP | 0.406 | Plastic | 1.535 | 55.7 | −4.07 |
| 13 | | 0.941 | ASP | 0.600 | | | | |
| 14 | IR-cut filter | Plano | | 0.200 | Glass | 1.517 | 64.2 | — |
| 15 | | Plano | | 0.371 | | | | |
| 16 | Image | Plano | | — | | | | |

Note:
Reference wavelength (d-line) is 587.6 nm.

TABLE 2

Aspheric Coefficients

| Surface # | 2 | 3 | 4 | 6 | 7 | |
|---|---|---|---|---|---|---|
| k = | 9.3654E−01 | 5.0000E+00 | −5.0000E+01 | −2.7611E+01 | −1.0000E+00 | −4.7740E+00 |
| A4 = | −1.3275E−02 | −4.1390E−02 | −1.4882E−01 | −5.1323E−02 | −6.2531E−02 | −8.7938E−02 |
| A6 = | −3.4023E−02 | −6.3765E−03 | −1.6174E−01 | −9.8306E−02 | 7.2035E−02 | 2.4736E−02 |
| A8 = | 1.4538E−01 | −3.3377E−02 | 5.9945E−01 | 1.7863E−01 | −1.9505E−01 | 2.0999E−02 |
| A10 = | −3.9611E−01 | −3.7275E−02 | −1.1354E+00 | −1.6422E−01 | 2.4505E−01 | −5.6091E−02 |
| A12 = | 4.7724E−01 | 4.5419E−02 | 1.0244E+00 | 7.1908E−02 | −1.3228E−01 | 3.0866E−02 |
| A14= | 2.4680E−01 | −8.2403E−02 | −4.5604E−01 | −2.3867E−02 | 2.7038E−02 | 5.1731E−03 |

| Surface # | 8 | 9 | 10 | 11 | 12 | 13 |
|---|---|---|---|---|---|---|
| k = | −1.6006E+00 | −1.4768E+00 | −2.1957E+01 | −1.5750E+01 | −2.0617E+01 | −4.9886E+00 |
| A4 = | 9.7467E−02 | −3.0389E−02 | 2.1964E−02 | 1.6750E−01 | −1.0508E−01 | −9.1557E−02 |
| A6 = | −1.0480E−01 | 6.9654E−02 | −4.0064E−02 | −1.5464E−01 | −6.5071E−03 | 2.5875E−02 |
| A8 = | 1.7136E−01 | −4.1901E−02 | −2.5362E−03 | 6.4669E−02 | 1.5586E−02 | −4.4805E−03 |
| A10 = | −1.4290E−01 | 3.4637E−02 | 1.1003E−02 | −1.6030E−02 | −4.1307E−03 | 4.5623E−04 |
| A12 = | 6.3275E−02 | −1.2106E−02 | −5.3086E−03 | 2.3341E−03 | 4.9925E−04 | −3.4339E−05 |
| A14 = | −1.2335E−02 | 1.4075E−03 | 1.0349E−03 | −1.7122E−04 | −2.9184E−05 | 2.4380E−06 |
| A16 = | | | −6.9361E−05 | 4.0251E−06 | 6.2622E−07 | −1.0455E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
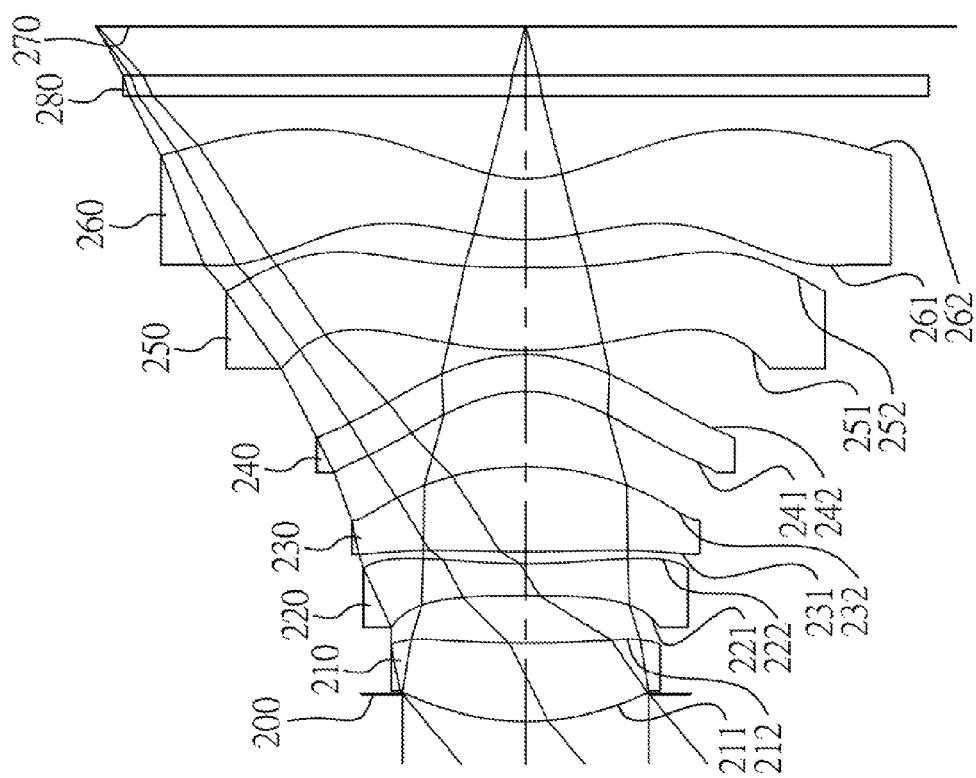
FIG. 3 is a schematic view of an imaging lens assembly according to the 2nd embodiment of the present disclosure.
Figure 4:
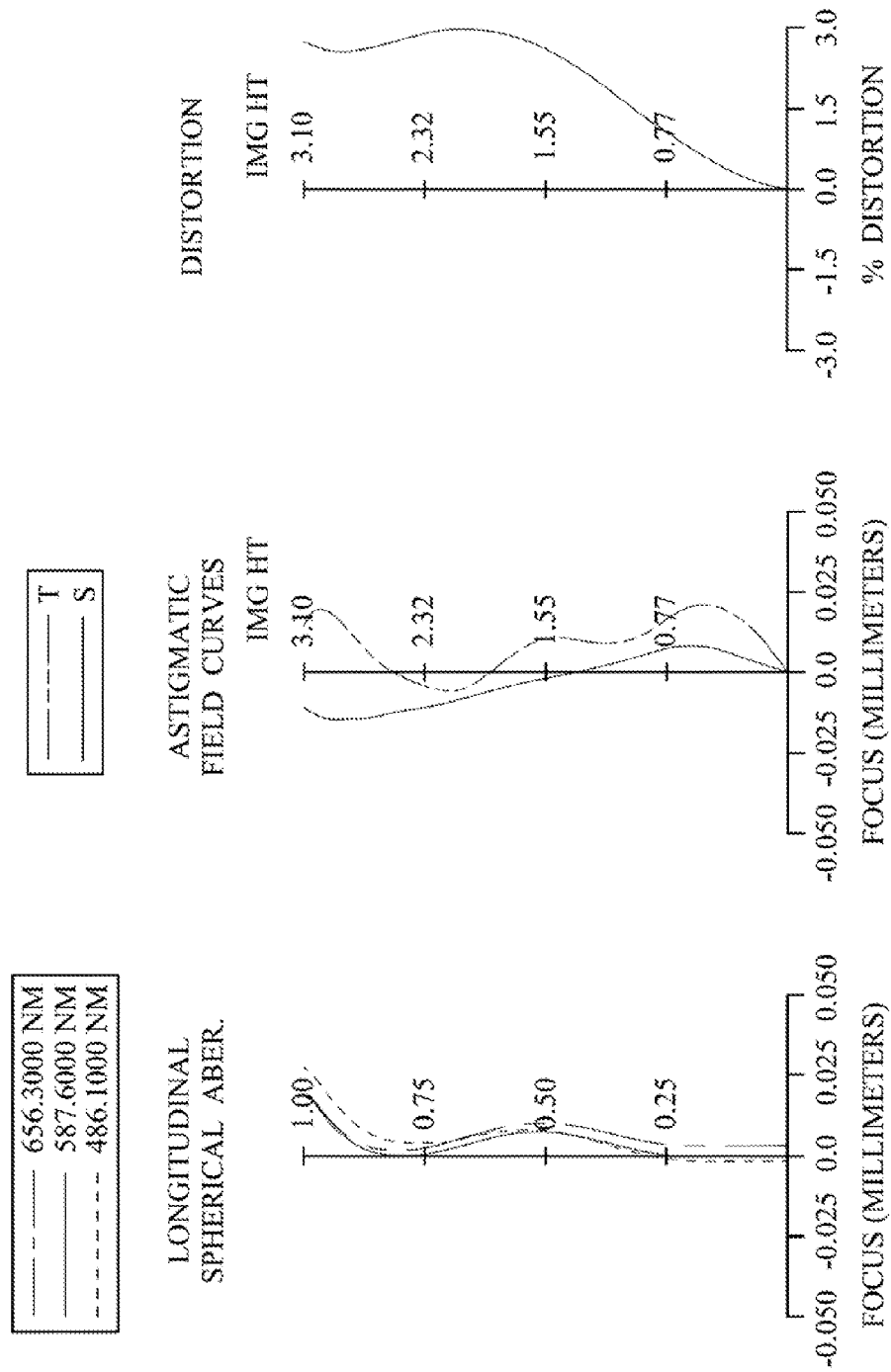
FIG. 4 shows spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows spherical aberration curves, astigmatic field curves and a distortion curve of the imaging lens assembly according to the 2nd embodiment. In FIG. 3, the imaging lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280 and an image plane 270, wherein the imaging lens assembly has a total of six lens elements with refractive power.

The first lens element 210 with positive refractive power has a convex object-side surface 211 and a concave image-side surface 212. The first lens element 210 is made of plastic material, and has the object-side surface 211 and the image-side surface 212 being both aspheric.

The second lens element 220 with negative refractive power has a concave object-side surface 221 and a concave image-side surface 222. The second lens element 220 is made of plastic material, and has the object-side surface 221 and the image-side surface 222 being both aspheric.

The third lens element 230 with positive refractive power has a convex object-side surface 231 and a convex image-side surface 232. The third lens element 230 is made of plastic material, and has the object-side surface 231 and the image-side surface 232 being both aspheric.

The fourth lens element 240 with negative refractive power has a concave object-side surface 241 and a convex image-side surface 242. The fourth lens element 240 is made of plastic material, and has the object-side surface 241 and the image-side surface 242 being both aspheric.

The fifth lens element 250 with positive refractive power has a convex object-side surface 251 and a concave image-side surface 252, wherein the object-side surface 251 of the fifth lens element 250 changes from convex at a paraxial region thereof to concave at a peripheral region thereof. The fifth lens element 250 is made of plastic material, and has the object-side surface 251 and the image-side surface 252 being both aspheric.

The sixth lens element 260 with negative refractive power has a convex object-side surface 261 and a concave image-side surface 262. The sixth lens element 260 is made of plastic material, and has the object-side surface 261 and the image-side surface 262 being both aspheric. Furthermore, the sixth lens element 260 has inflection points on the object-side surface 261 and the image-side surface 262 thereof.

The IR-cut filter 280 is made of glass material and located between the sixth lens element 260 and the image plane 270, and will not affect the focal length of the imaging lens assembly.

The detailed optical data of the 2nd embodiment are shown in Table 3 and the aspheric surface data are shown in Table 4 below.

TABLE 3

2nd Embodiment
f = 3.55 mm, Fno = 2.00, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.193 | | | | |
| 2 | Lens 1 | 2.000 | ASP | 0.564 | Plastic | 1.570 | 54.5 | 4.68 |
| 3 | | 7.154 | ASP | 0.340 | | | | |

TABLE 3-continued

2nd Embodiment
f = 3.55 mm, Fno = 2.00, HFOV = 40.3 deg.

| Surface # | | Curvature Radius | | Thickness | Material | Index | Abbe # | Focal Length |
|---|---|---|---|---|---|---|---|---|
| 4 | Lens 2 | −19.506 | ASP | 0.232 | Plastic | 1.639 | 23.5 | −5.39 |
| 5 | | 4.204 | ASP | 0.087 | | | | |
| 6 | Lens 3 | 13.896 | ASP | 0.611 | Plastic | 1.570 | 54.5 | 3.34 |
| 7 | | −2.170 | ASP | 0.540 | | | | |
| 8 | Lens 4 | −0.920 | ASP | 0.270 | Plastic | 1.639 | 23.5 | −7.88 |
| 9 | | −1.255 | ASP | 0.030 | | | | |
| 10 | Lens 5 | 2.666 | ASP | 0.600 | Plastic | 1.535 | 55.7 | 5.58 |
| 11 | | 22.952 | ASP | 0.200 | | | | |
| 12 | Lens 6 | 1.574 | ASP | 0.435 | Plastic | 1.535 | 55.7 | −5.71 |
| 13 | | 0.939 | ASP | 0.600 | | | | |
| 14 | IR-cut filter | Plano | | 0.145 | Glass | 1.517 | 64.2 | — |
| 15 | | Plano | | 0.358 | | | | |
| 16 | Image | Plano | | — | | | | |

Note:
Reference wavelength (d-line) is 587.6 nm.

TABLE 4

Aspheric Coefficients

| Surface # | 2 | 3 | 4 | 5 | 6 | 7 |
|---|---|---|---|---|---|---|
| k = | 9.8957E−01 | 5.0000E+00 | −1.0000E+00 | −2.9959E+01 | −1.0000E+00 | −4.0961E+00 |
| A4 = | −1.1744E−02 | −2.3122E−02 | −1.3629E−01 | −4.4271E−02 | −3.7049E−02 | −8.3924E−02 |
| A6 = | −2.5264E−02 | −1.8217E−02 | −1.5385E−01 | −6.8279E−02 | 4.0192E−02 | 2.1319E−02 |
| A8 = | 1.0621E−01 | −1.2955E−02 | 4.9216E−01 | 1.3540E−01 | −1.5958E−01 | 1.8398E−02 |
| A10 = | −2.7766E−01 | −3.9843E−02 | −8.6660E−01 | −1.2884E−01 | 1.8969E−01 | −4.3668E−02 |
| A12 = | 3.1350E−01 | 3.8144E−02 | 7.0899E−01 | 6.0404E−02 | −9.0920E−02 | 1.9817E−02 |
| A14 = | −1.4520E−01 | −4.9757E−02 | −2.9866E−01 | −1.5945E−02 | 1.6393E−02 | 1.8090E−03 |

| Surface # | 8 | 9 | 10 | 11 | 12 | 13 |
|---|---|---|---|---|---|---|
| k = | −1.7628E+00 | −1.4652E+00 | −1.7793E+01 | −2.8349E+01 | −9.2949E+00 | −4.0403E+00 |
| A4 = | 8.9440E−02 | −1.3627E−02 | 4.7091E−02 | 1.4978E−01 | −9.3775E−02 | −8.3502E−02 |
| A6 = | −8.7666E−02 | 5.6016E−02 | −5.0510E−02 | −1.3389E−01 | −5.8337E−03 | 2.1426E−02 |
| A8 = | 1.3789E−01 | −4.1123E−02 | 1.1873E−03 | 5.1896E−02 | 1.2558E−02 | −3.3151E−03 |
| A10 = | −1.0971E−01 | 2.6258E−02 | 8.2450E−03 | 1.2124E−02 | −3.1319E−03 | 3.3478E−04 |
| A12 = | 4.4798E−02 | −8.6298E−03 | −3.8202E−03 | 1.6706E−03 | 3.5791E−04 | −2.6905E−05 |
| A14 = | −7.9464E−03 | 9.4345E−04 | 6.8830E−04 | 1.1459E−04 | −1.9551E−05 | 1.8262E−06 |
| A16 = | | | −4.1278E−05 | 2.4731E−06 | 3.8474E−07 | −5.7418E−08 |

In the imaging lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following relationships:

| f (mm) | 3.55 | f/f3 | 1.06 |
|---|---|---|---|
| Fno | 2.00 | f/f6 | −0.62 |
| HFOV (deg.) | 40.3 | f3/f1 | 0.71 |
| (V2 + V4)/V6 | 0.84 | ΣCT/TD | 0.69 |
| CT2/T12 | 3.68 | SD11/SD62 | 0.34 |
| (T56 + CT6)/CT5 | 1.06 | Yc51/Yc62 | 0.75 |
| (R5 + R6)/(R5 − R6) | 0.73 | TL (mm) | 5.01 |
| (R9 + R10)/(R9 − R10) | −1.26 | | |

3rd Embodiment

Figure 5:
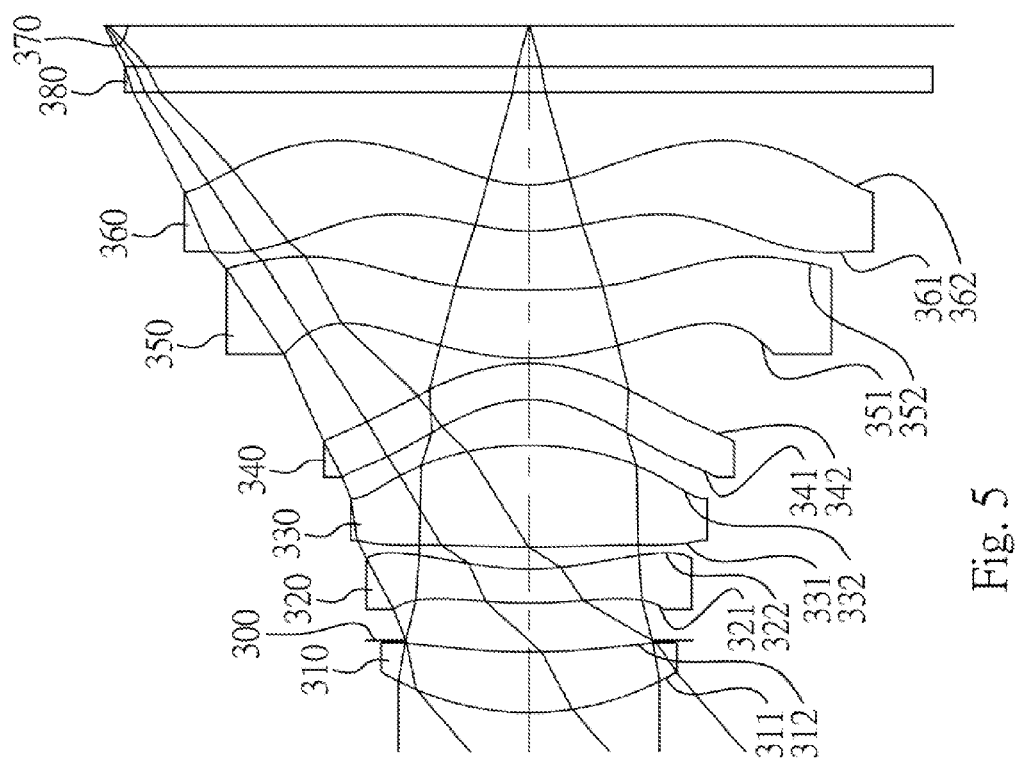
FIG. 5 is a schematic view of an imaging lens assembly according to the 3rd embodiment of the present disclosure.
Figure 6:
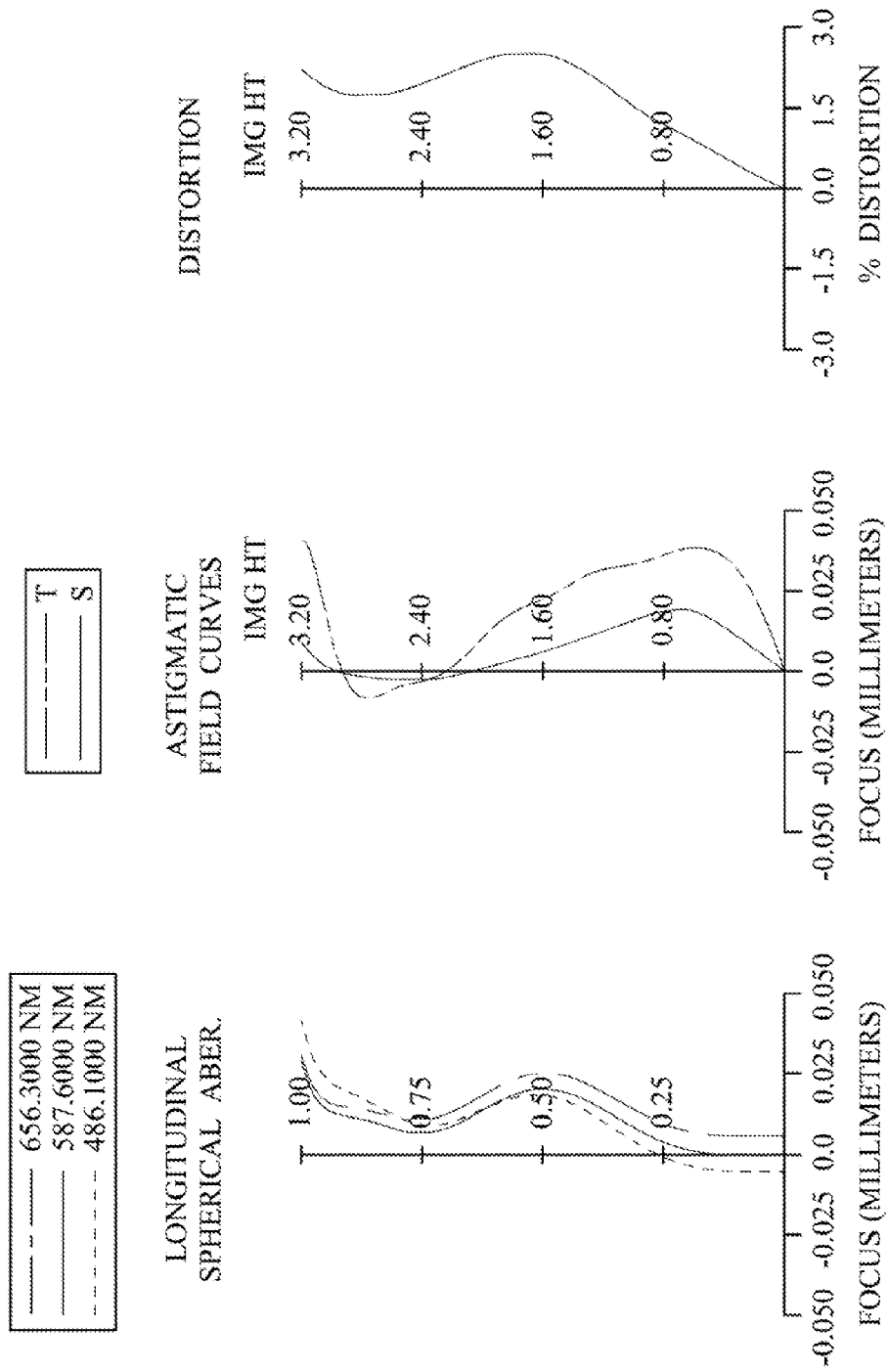
FIG. 6 shows spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows spherical aberration curves, astigmatic field curves and a distortion curve of the imaging lens assembly according to the 3rd embodiment. In FIG. 5, the imaging lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 380 and an image plane 370, wherein the imaging lens assembly has a total of six lens elements with refractive power.

The first lens element 310 with positive refractive power has a convex object-side surface 311 and a concave image-side surface 312. The first lens element 310 is made of plastic material, and has the object-side surface 311 and the image-side surface 312 being both aspheric.

The second lens element 320 with negative refractive power has a convex object-side surface 321 and a concave image-side surface 322. The second lens element 320 is made of plastic material, and has the object-side surface 321 and the image-side surface 322 being both aspheric.

The third lens element 330 with positive refractive power has a convex object-side surface 331 and a convex image-side surface 332. The third lens element 330 is made of plastic material, and has the object-side surface 331 and the image-side surface 332 being both aspheric.

The fourth lens element 340 with negative refractive power has a concave object-side surface 341 and a convex image-side surface 342. The fourth lens element 340 is made of plastic material, and has the object-side surface 341 and the image-side surface 342 being both aspheric.

The fifth lens element 350 with positive refractive power has a convex object-side surface 351 and a concave image-side surface 352, wherein the object-side surface 351 of the fifth lens element 350 changes from convex at a paraxial region thereof to concave at a peripheral region thereof. The fifth lens element 350 is made of plastic material, and has the object-side surface 351 and the image-side surface 352 being both aspheric.

The sixth lens element 360 with negative refractive power has a convex object-side surface 361 and a concave image-side surface 362. The sixth lens element 360 is made of plastic material, and has the object-side surface 361 and the image-side surface 362 being both aspheric. Furthermore, the sixth lens element 360 has inflection points on the object-side surface 361 and the image-side surface 362 thereof.

The IR-cut filter 380 is made of glass material and located between the sixth lens element 360 and the image plane 370, and will not affect the focal length of the imaging lens assembly.

The detailed optical data of the 3rd embodiment are shown in Table 5 and the aspheric surface data are shown in Table 6 below.

TABLE 5

3rd Embodiment
f = 3.60 mm, FRO = 1.82, HFOV = 40.9 deq.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.188 | ASP | 0.456 | Plastic | 1.570 | 54.5 | 6.30 |
| 2 | | 5.182 | ASP | 0.086 | | | | |
| 3 | Ape. Stop | Plano | | 0.287 | | | | |
| 4 | Lens 2 | 3.531 | ASP | 0.260 | Plastic | 1.650 | 21.4 | −10.71 |
| 5 | | 2.274 | ASP | 0.167 | | | | |
| 6 | Lens 3 | 13.360 | ASP | 0.770 | Plastic | 1.570 | 54.5 | 3.65 |
| 7 | | −2.413 | ASP | 0.346 | | | | |
| 8 | Lens 4 | −0.891 | ASP | 0.270 | Plastic | 1.639 | 23.5 | −5.21 |
| 9 | | −1.360 | ASP | 0.040 | | | | |
| 10 | Lens 5 | 2.030 | ASP | 0.521 | Plastic | 1.570 | 54.5 | 4.41 |
| 11 | | 9.568 | ASP | 0.446 | | | | |
| 12 | Lens 6 | 1.433 | ASP | 0.350 | Plastic | 1.570 | 54.5 | −6.38 |
| 13 | | 0.937 | ASP | 0.700 | | | | |
| 14 | IR-cut filter | Plano | | 0.200 | Glass | 1.517 | 64.2 | — |
| 15 | | Plano | | 0.303 | | | | |
| 16 | Image | Plano | | — | | | | |

Note:
Reference wavelength (d-line) is 587.6 nm.

TABLE 6

Aspheric Coefficients

| Surface # | 1 | 2 | 4 | 5 | 6 | 7 |
|---|---|---|---|---|---|---|
| k = | 2.0783E+00 | −5.8120E+00 | −1.0000E+00 | −6.8200E+00 | −1.0000E+00 | −4.5462E+00 |
| A4 = | −1.9132E−02 | −1.4992E−02 | 1.2809E−01 | −4.1622E−02 | −2.8975E−02 | −8.2607E−02 |
| A6 = | −4.2394E−02 | −7.9470E−03 | −1.2317E−01 | −6.4481E−02 | 4.7460E−02 | 1.6319E−02 |
| A8 = | 1.1359E−01 | 3.0562E−02 | 3.8193E−01 | 1.1077E−01 | −1.3231E−01 | 1.8907E−02 |
| A10 = | −1.9824E−01 | −4.3088E−02 | −6.3290E−01 | −9.5373E−02 | 1.4246E−01 | −3.0659E−02 |
| A12 = | 1.5776E−01 | 1.3895E−02 | 5.1740E−01 | 4.2095E−02 | −6.0591E−02 | 1.3782E−02 |
| A14 = | −5.3670E−02 | −4.0512E−03 | −1.8536E−01 | −9.9825E−03 | 9.3520E−03 | −3.0423E−04 |

| Surface # | 8 | 9 | 10 | 11 | 12 |
|---|---|---|---|---|---|
| k = | −1.9673E+00 | −1.4337E+00 | −1.0036E+01 | 4.8706E+00 | −1.0194E+01 | −4.4853E+00 |
| A4 = | 7.4035E−02 | −4.5496E−03 | 5.8225E−02 | 1.5293E−01 | −8.3674E−02 | −7.4321E−02 |
| A6 = | −7.5866E−02 | 5.0946E−02 | 4.0767E−02 | −1.1772E−01 | −4.9111E−03 | 1.5908E−02 |
| A8 = | 1.1293E−02 | −3.5338E−02 | −1.1343E−02 | 4.1899E−02 | 1.0046E−02 | −2.5603E−03 |
| A10 = | −8.1654E−02 | 1.9732E−02 | 6.2525E−03 | −9.0866E−03 | −2.3547E−03 | 2.6799E−04 |
| A12 = | 3.1372E−02 | −6.0860E−03 | −2.6169E−03 | 1.1765E−03 | 2.5237E−04 | −1.8227E−05 |
| A14 = | −5.4357E−03 | 6.2441E−04 | 4.5943E−04 | −7.6500E−05 | −1.2947E−05 | 1.1658E−06 |
| A16 = | | | −2.8938E−05 | 1.4874E−06 | 2.3211E−07 | −3.9904E−08 |

In the imaging lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.60 | f/f3 | 0.99 |
| Fno | 1.82 | f/f6 | −0.56 |
| HFOV (deg.) | 40.9 | f3/f1 | 0.58 |
| (V2 + V4)/V6 | 0.82 | ΣCT/TD | 0.66 |
| CT2/T12 | 0.70 | SD11/SD62 | 0.43 |
| (T56 + CT6)/CT5 | 1.53 | Yc51/Yc62 | 0.96 |
| (R5 + R6)/(R5 − R6) | 0.69 | TL (mm) | 5.20 |
| (R9 + R10)/(R9 − R10) | −1.54 | | |

4th Embodiment

Figure 7:
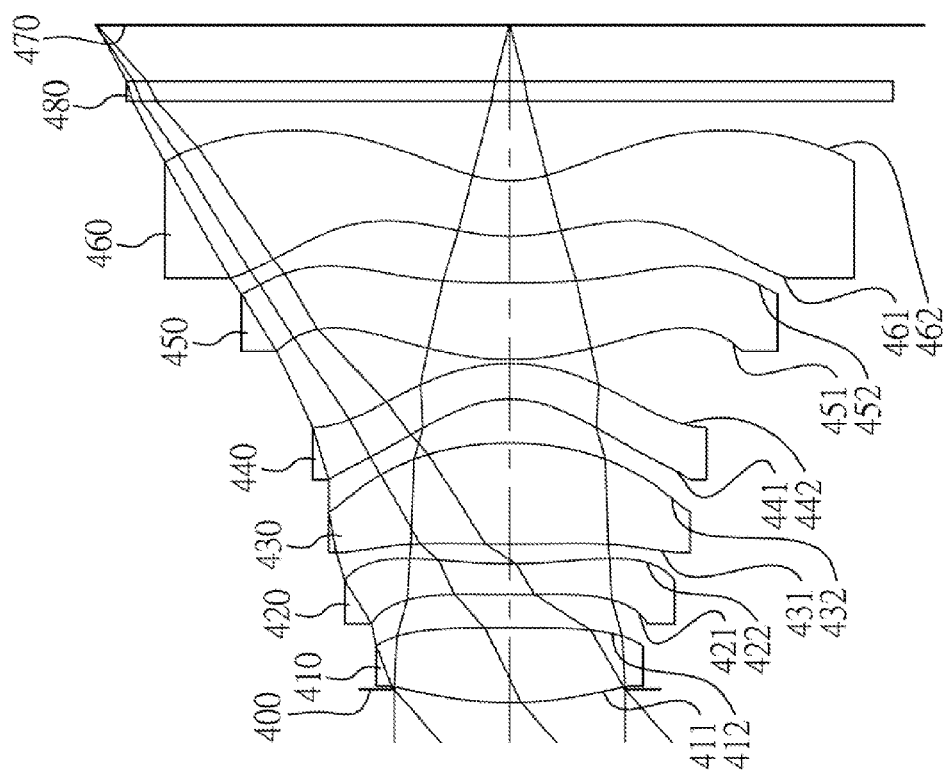
FIG. 7 is a schematic view of an imaging lens assembly according to the 4th embodiment of the present disclosure.
Figure 8:
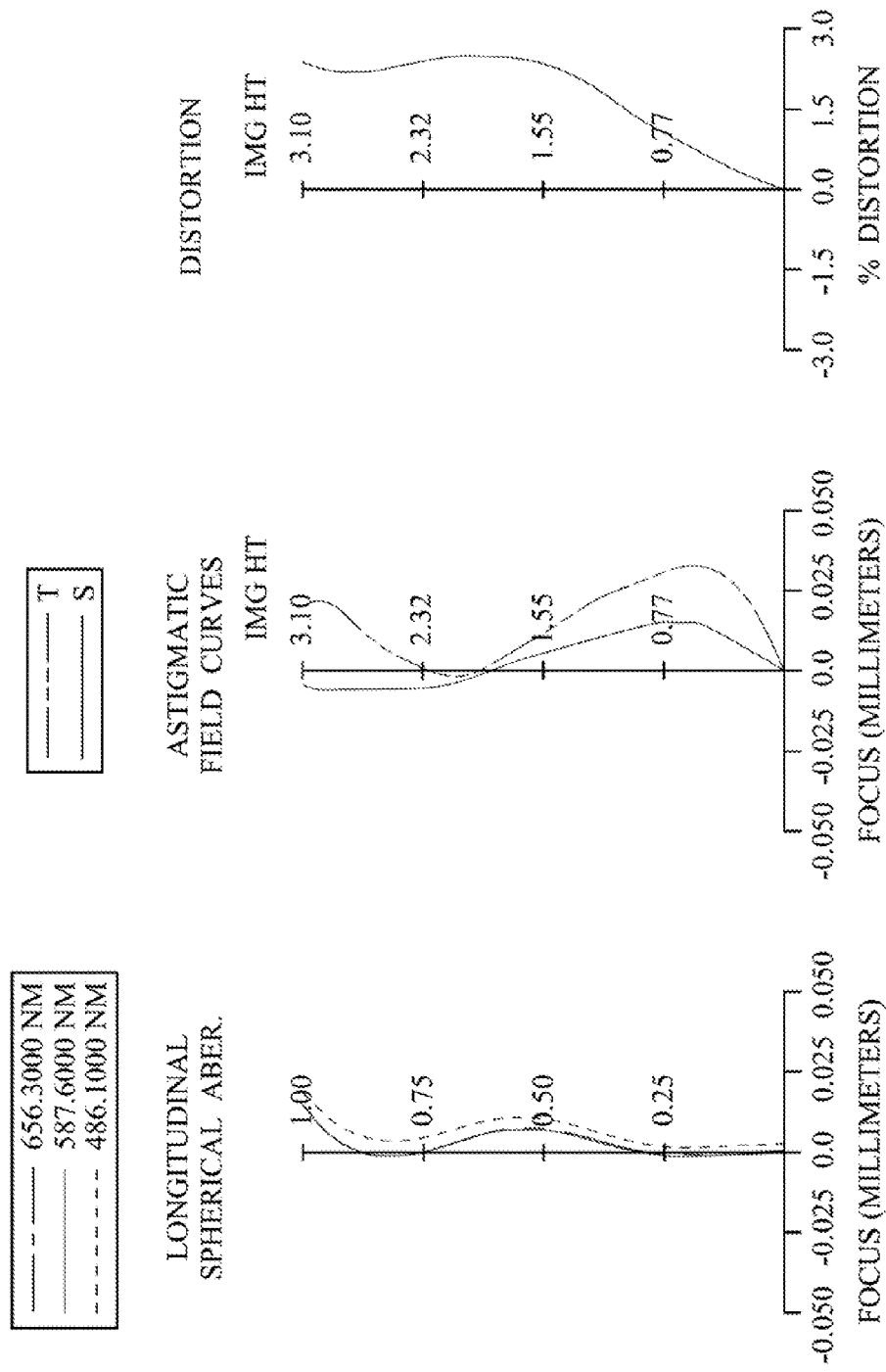
FIG. 8 shows spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows spherical aberration curves, astigmatic field curves and a distortion curve of the imaging lens assembly according to the 4th embodiment. In FIG. 7, the imaging lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480 and an image plane 470, wherein the imaging lens assembly has a total of six lens elements with refractive power.

The first lens element 410 with positive refractive power has a convex object-side surface 411 and a convex image-side surface 412. The first lens element 410 is made of plastic material, and has the object-side surface 411 and the image-side surface 412 being both aspheric.

The second lens element 420 with negative refractive power has a convex object-side surface 421 and a concave image-side surface 422. The second lens element 420 is made of plastic material, and has the object-side surface 421 and the image-side surface 422 being both aspheric.

The third lens element 430 with positive refractive power has a convex object-side surface 431 and a convex image-side surface 432. The third lens element 430 is made of plastic material, and has the object-side surface 431 and the image-side surface 432 being both aspheric.

The fourth lens element 440 with negative refractive power has a concave object-side surface 441 and a convex image-side surface 442. The fourth lens element 440 is made of plastic material, and has the object-side surface 441 and the image-side surface 442 being both aspheric.

The fifth lens element 450 with positive refractive power has a convex object-side surface 451 and a concave image-side surface 452, wherein the object-side surface 451 of the fifth lens element 450 changes from convex at a paraxial region thereof to concave at a peripheral region thereof. The fifth lens element 450 is made of plastic material, and has the object-side surface 451 and the image-side surface 452 being both aspheric.

The sixth lens element 460 with negative refractive power has a convex object-side surface 461 and a concave image-side surface 462. The sixth lens element 460 is made of plastic material, and has the object-side surface 461 and the image-side surface 462 being both aspheric. Furthermore, the sixth lens element 460 has inflection points on the object-side surface 461 and the image-side surface 462 thereof.

The IR-cut filter 480 is made of glass material and located between the sixth lens element 460 and the image plane 470, and will not affect the focal length of the imaging lens assembly.

The detailed optical data of the 4th embodiment are shown in Table 7 and the aspheric surface data are shown in Table 8 below.

TABLE 7

4th Embodiment
f = 3.46 mm, Fno = 2.00, HFOV = 41.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.100 | | | | |
| 2 | Len 1 | 2.760 | ASP | 0.560 | Plastic | 1.544 | 55.9 | 4.46 |
| 3 | | −18.776 | ASP | 0.250 | | | | |
| 4 | Lens 2 | 25.505 | ASP | 0.230 | Plastic | 1.640 | 23.3 | −7.07 |
| 5 | | 3.830 | ASP | 0.148 | | | | |
| 6 | Lens 3 | 19.985 | ASP | 0.755 | Plastic | 1.544 | 55.9 | 3.98 |
| 7 | | −2.397 | ASP | 0.325 | | | | |
| 8 | Lens 4 | 0.849 | ASP | 0.270 | Plastic | 1.640 | 23.3 | −5.05 |
| 9 | | −1.295 | ASP | 0.030 | | | | |
| 10 | Lens 5 | 1.960 | ASP | 0.579 | Plastic | 1.544 | 55.9 | 4.91 |
| 11 | | 17.323 | ASP | 9.353 | | | | |
| 12 | Lens 6 | 1.453 | ASP | 0.411 | Plastic | 1.544 | 55.9 | −5.52 |
| 13 | | 0.882 | ASP | 0.600 | | | | |
| 14 | IR-cut filler | Plano | | 0.145 | Glass | 1.517 | 64.2 | — |
| 15 | | Plano | | 0.425 | | | | |
| 16 | Image | Plano | | — | | | | |

Note:
Reference wavelength (d-line) is 587.6 nm.

TABLE 8

Aspheric Coefficients

| Surface # | 2 | 3 | 4 | 5 | 6 | 7 |
|---|---|---|---|---|---|---|
| k = | 4.8779E−01 | 4.9976E+00 | −1.0000E+00 | −2.3568E+01 | −1.0000E+00 | −3.4800E+00 |
| A4 = | −1.5811E−02 | −5.2256E−02 | −1 2120E−01 | −5.5007E−02 | −5.0925E−02 | −8.8499E−02 |
| A6 = | −4.0485E−02 | −2.5679E−02 | −1.5255E−01 | −7.8682E−02 | 3.8817E−02 | 2.1814E−02 |
| A8 = | 1.0274E−01 | 8.1338E−03 | 4.9130E−01 | 1.3183E−01 | −1.6103E−01 | 2.1472E−02 |
| A10 = | −2.7376E−01 | −4.0163E−02 | −8.6964E−01 | −1.2862E−01 | 1.9035E−01 | −4.2775E−02 |
| A12 = | 3.0714E−01 | 3.1450E−02 | 7.1643E−01 | 6.1333E−02 | −8.8410E−02 | 1.8272E−02 |
| A14 = | −1.4761E−01 | −1.8433E−02 | −2.6107E−01 | −1.4912E−02 | 1.5237E−02 | −1.1821E−03 |

| Surface # | 8 | 9 | 10 | 11 | 12 | 13 |
|---|---|---|---|---|---|---|
| k = | −1.8545E+00 | −1.5832E+00 | −9.4830E+00 | −1.8014E+00 | −9 4275E+00 | −3.8851E+00 |
| A4 = | 8.8897E−02 | −1.0072E−02 | 4.6515E−02 | 1.5454E−01 | −1.0357E−01 | −8.4294E−02 |
| A6 = | −8.6351E−02 | 5.7754E−02 | −4.3131E−02 | −1.3529E−01 | −5.6724E−03 | 2.1554E−02 |
| A8 = | 1.3762E−01 | −3.9578E−02 | −9.0101E−04 | 5.1762E−02 | 1.2598E−02 | −3.3441E−03 |
| A10 = | −1.0996E−01 | 2.6258E−02 | 7.9247E−03 | −1.2152E−02 | −3.1313E−03 | 3.4070E−04 |
| A12 = | 4.4581E−02 | −8.6298E−03 | −3.6853E−03 | 1.6681E−03 | 3.5894E−04 | −2.7808E−05 |
| A14 = | −8.1402E−03 | 9.4345E−04 | 7.2361E−04 | −1.1328E−04 | −1.9424E−05 | 1.8663E−06 |
| A16 = | | | −5.1552E−05 | 3.2305E−06 | 3.9114E−07 | −7.2235E−08 |

In the imaging lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.46 | f/f3 | 0.87 |
| Fno | 2.00 | f/f6 | −0.63 |
| HFOV (deg.) | 41.2 | f3/f1 | 0.89 |
| (V2 + V4)/V6 | 0.83 | ΣCT/TD | 0.72 |
| CT2/T12 | 0.92 | SD11/SD62 | 0.34 |
| (T56 + CT6)/CT5 | 1.34 | Yc51/Yc62 | 0.82 |
| (R5 + R6)/(R5 − R6) | 0.79 | TL (mm) | 5.07 |
| (R9 + R10)/(R9 − R10) | −1.26 | | |

5th Embodiment

Figure 9:
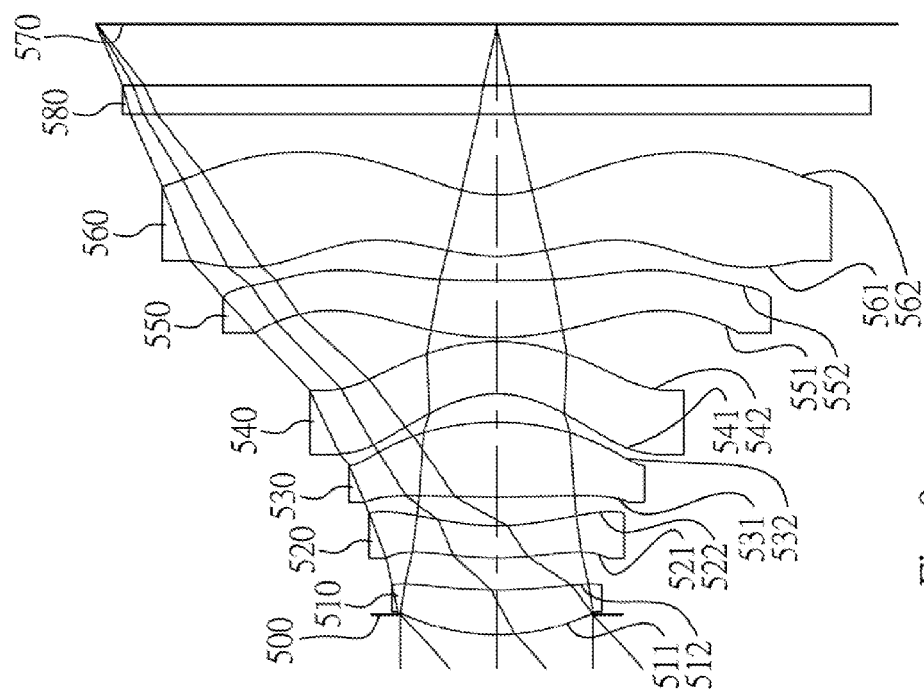
FIG. 9 is a schematic view of an imaging lens assembly according to the 5th embodiment of the present disclosure.
Figure 10:
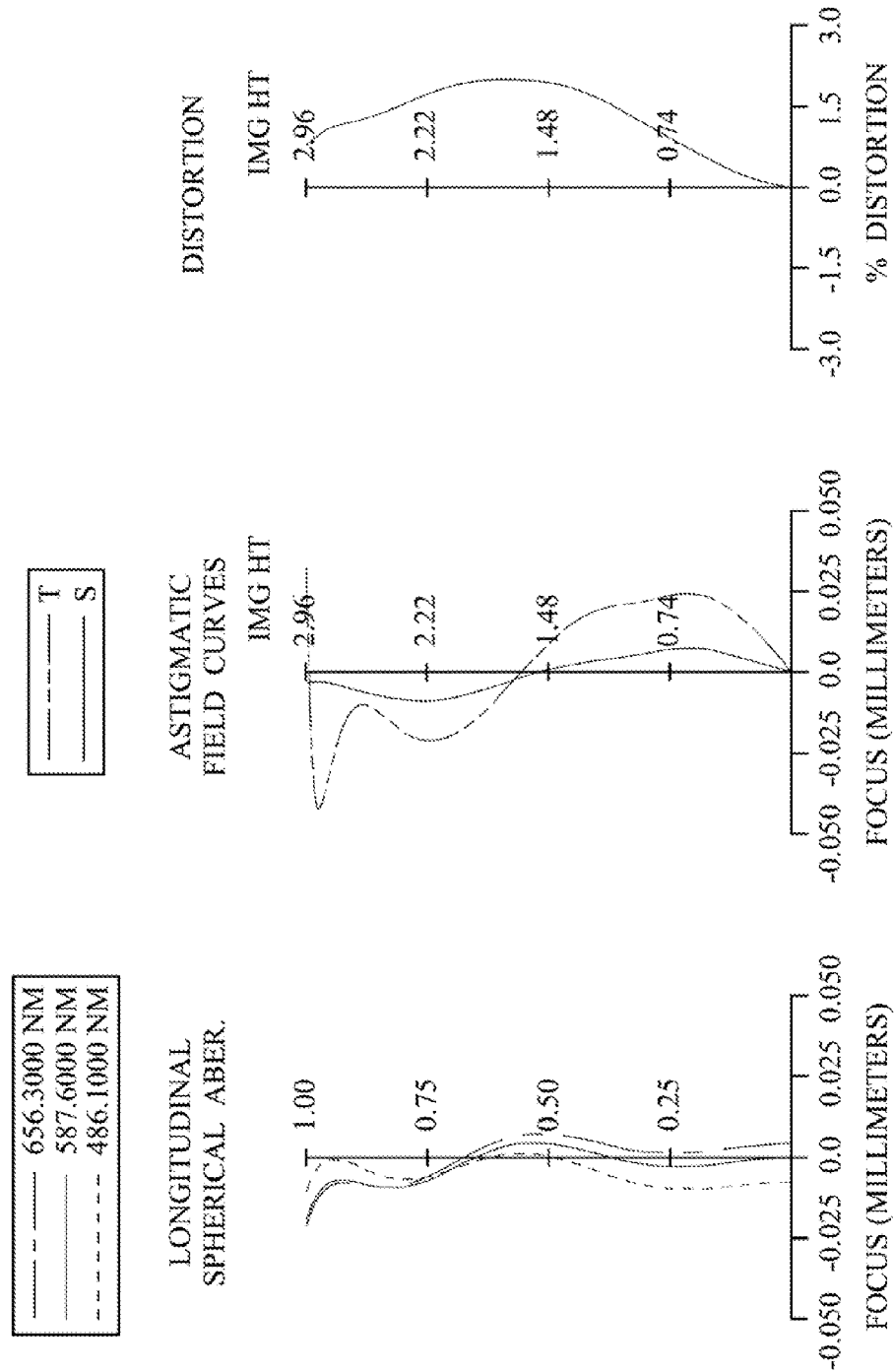
FIG. 10 shows spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows spherical aberration curves, astigmatic field curves and a distortion curve of the imaging lens assembly according to the 5th embodiment. In FIG. 9, the imaging lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570, wherein the imaging lens assembly has a total of six lens elements with refractive power.

The first lens element 510 with positive refractive power has a convex object-side surface 511 and a concave image-side surface 512. The first lens element 510 is made of plastic material, and has the object-side surface 511 and the image-side surface 512 being both aspheric.

The second lens element 520 with negative refractive power has a convex object-side surface 521 and a concave image-side surface 522. The second lens element 520 is made of plastic material, and has the object-side surface 521 and the image-side surface 522 being both aspheric.

The third lens element 530 with positive refractive power has a convex object-side surface 531 and a convex image-side surface 532. The third lens element 530 is made of plastic material, and has the object-side surface 531 and the image-side surface 532 being both aspheric.

The fourth lens element 540 with negative refractive power has a concave object-side surface 541 and a convex image-side surface 542. The fourth lens element 540 is made of plastic material, and has the object-side surface 541 and the image-side surface 542 being both aspheric.

The fifth lens element 550 with positive refractive power has a convex object-side surface 551 and a concave image-side surface 552, wherein the object-side surface 551 of the fifth lens element 550 changes from convex at a paraxial region thereof to concave at a peripheral region thereof. The fifth lens element 550 is made of plastic material, and has the object-side surface 551 and the image-side surface 552 being both aspheric.

The sixth lens element 560 with negative refractive power has a convex object-side surface 561 and a concave image-side surface 562. The sixth lens element 560 is made of plastic material, and has the object-side surface 561 and the image-side surface 562 being both aspheric. Furthermore, the sixth lens element 560 has inflection points on the object-side surface 561 and the image-side surface 562 thereof.

The IR-cut filter 580 is made of glass material and located between the sixth lens element 560 and the image plane 570, and will not affect the focal length of the imaging lens assembly.

The detailed optical data of the 5th embodiment are shown in Table 9 and the aspheric surface data are shown in Table 10 below.

TABLE 9

5th Embodiment
f = 3.21 mm, Fno = 2.25, HFOV = 42.5 deg.

| Surface Length | | Curvature Radius | | Thickness | Material | Index | Abbe # | Focal Length |
|---|---|---|---|---|---|---|---|---|
| 0 | Object | Plano | | infinity | | | | |
| 1 | Ape. Stop | Plano | | −0.152 | | | | |
| 2 | Lens 1 | 1.616 | ASP | 0.333 | Plastic | 1.544 | 55.9 | 5.48 |
| 3 | | 3.271 | ASP | 0.237 | | | | |
| 4 | Lens 2 | 2.218 | ASP | 0.240 | Plastic | 1.640 | 23.3 | −22.78 |
| 5 | | 1.844 | ASP | 0.209 | | | | |
| 6 | Lens 3 | 14.178 | ASP | 0.556 | Plastic | 1.544 | 55.9 | 3.26 |
| 7 | | −2.003 | ASP | 0.209 | | | | |
| 8 | Lens 4 | −0.779 | ASP | 0.389 | Plastic | 1.640 | 23.3 | −3.29 |
| 9 | | −1.479 | ASP | 0.030 | | | | |
| 10 | Lens 5 | 2.103 | ASP | 0.419 | Plastic | 1.544 | 55.9 | 3.94 |
| 11 | | 100.000 | ASP | 0.180 | | | | |
| 12 | Lens 6 | 1.317 | ASP | 0.456 | Plastic | 1.544 | 55.9 | −8.81 |
| 13 | | 0.907 | ASP | 0.600 | | | | |
| 14 | IR-cut filter | Plano | | 0.210 | Glass | 1.517 | 64.2 | — |
| 15 | | Plano | | 0.453 | | | | |
| 16 | image | Plano | | — | | | | |

Note:
Reference wavelength (d-line) is 587.6 nm.

TABLE 10

Aspheric Coefficients

| Surface # | 2 | 3 | 4 | 5 | 6 | 7 |
|---|---|---|---|---|---|---|
| k = | 8.6992E−01 | 9.3236E+00 | −9.9204E−01 | −4.4307E+00 | 1.0000E+01 | −4.1955E+00 |
| A4 = | −2.3728E−02 | −1.2981E−01 | −2.0957E−01 | −7.1043E−02 | −4.7557E−02 | −1.2432E−01 |
| A6 = | −6.2571E−02 | 6.6930E−03 | 4.2351E−01 | −2.1936E−01 | 1.3773E−01 | 5.5934E−02 |
| A8 = | 3.8369E−01 | −1.0639E−01 | 1.5380E+00 | 4.4310E−01 | −5.2035E−01 | 5.8536E−02 |
| A10 = | −1.2839E+00 | −1.3032E−01 | −3.6457E+00 | −5.0108E−01 | 7.5593E−01 | −1.8826E−01 |
| A12 = | 1.7838E+00 | 2.2509E−01 | 4.2038E+00 | 3.1529E−01 | −5.5697E−01 | 1.0988E−01 |
| A14 = | −1.1160E+00 | −4.6009E−01 | −2.1495E+00 | −1.2674E−01 | 1.5027E−01 | 7.9975E−03 |

| Surface # | 8 | 9 | 10 | 11 | 12 | 13 |
|---|---|---|---|---|---|---|
| k = | −1.5621E+00 | −1.0506E+00 | −8.4974E+00 | −5.0000E+01 | −6.1566E+00 | −3.6548E+00 |
| A4 = | 1.4192E−01 | −6.2457E−02 | 6.4028E−02 | 2.4385E−01 | −1.5191E−01 | −1.3553E−01 |
| A6 = | −1.9895E−01 | 1.4113E−01 | −8.2434E−02 | −2.9695E−01 | −1.4309E−02 | 5.0227E−02 |
| A8 = | 4.3282E−01 | −1.1760E−01 | −4.2437E−03 | 1.6059E−01 | 3.8713E−02 | −1.0992E−02 |
| A10 = | −4.4698E−01 | 1.1081E−01 | 3.5642E−02 | −5.1101E−02 | −1.3120E−02 | 1.4251E−03 |
| A12 = | 2.6541E−01 | −5.0151E−02 | −2.1551E−02 | 9.6457E−03 | 2.0553E−03 | −1.3863E−04 |
| A14 = | −6.8541E−02 | 7.5502E−03 | 5.7245E−93 | −9.2207E−04 | −1.5889E−04 | 1.3346E−05 |
| A16 = | | | −5.8190E−04 | 2.7444E−05 | 4.8358E−06 | −7.1835E−07 |

In the imaging lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following relationships:

| f (mm) | 3.21 | f/f3 | 0.98 |
|---|---|---|---|
| Fno | 2.25 | f/f6 | −0.36 |
| HFOV (deg.) | 42.5 | f3/f1 | 0.60 |
| (V2 + V4)/V6 | 0.83 | ΣCT/TD | 0.73 |
| CT2/T12 | 1.01 | SD11/SD62 | 0.30 |
| (T56 + CT6)/CT5 | 1.52 | Yc51/Yc62 | 0.85 |
| (R5 + R6)/(R5 − R6) | 0.75 | TL (mm) | 4.52 |
| (R9 + R10)/(R9 − R10) | −1.04 | | |

6th Embodiment

Figure 11:
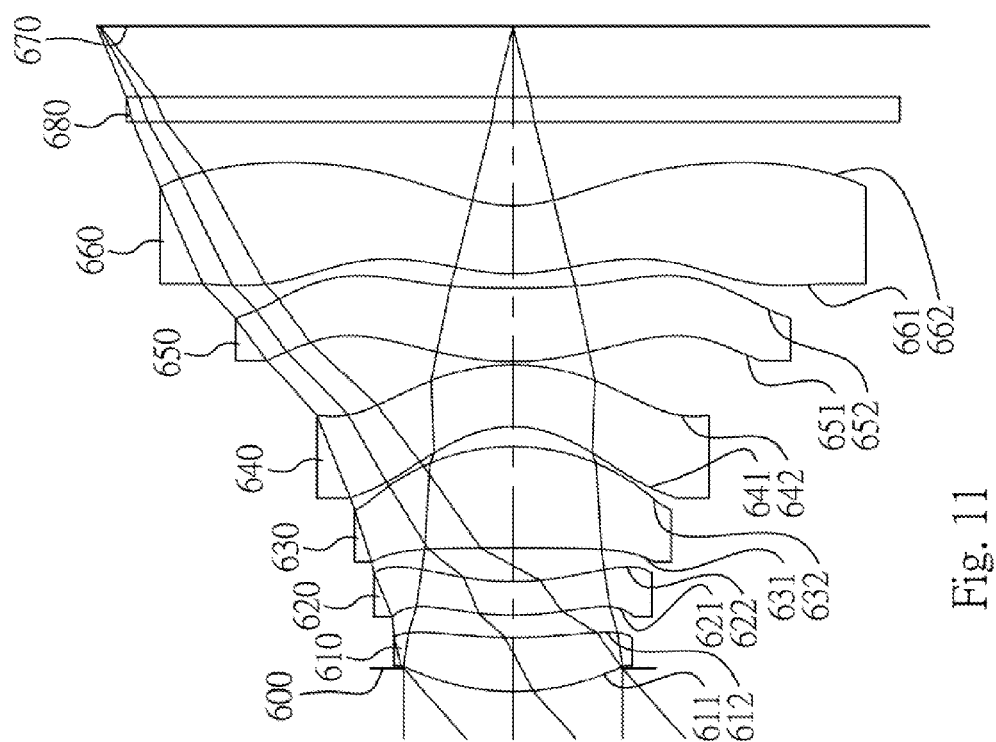
FIG. 11 is a schematic view of an imaging lens assembly according to the 6th embodiment of the present disclosure.
Figure 12:
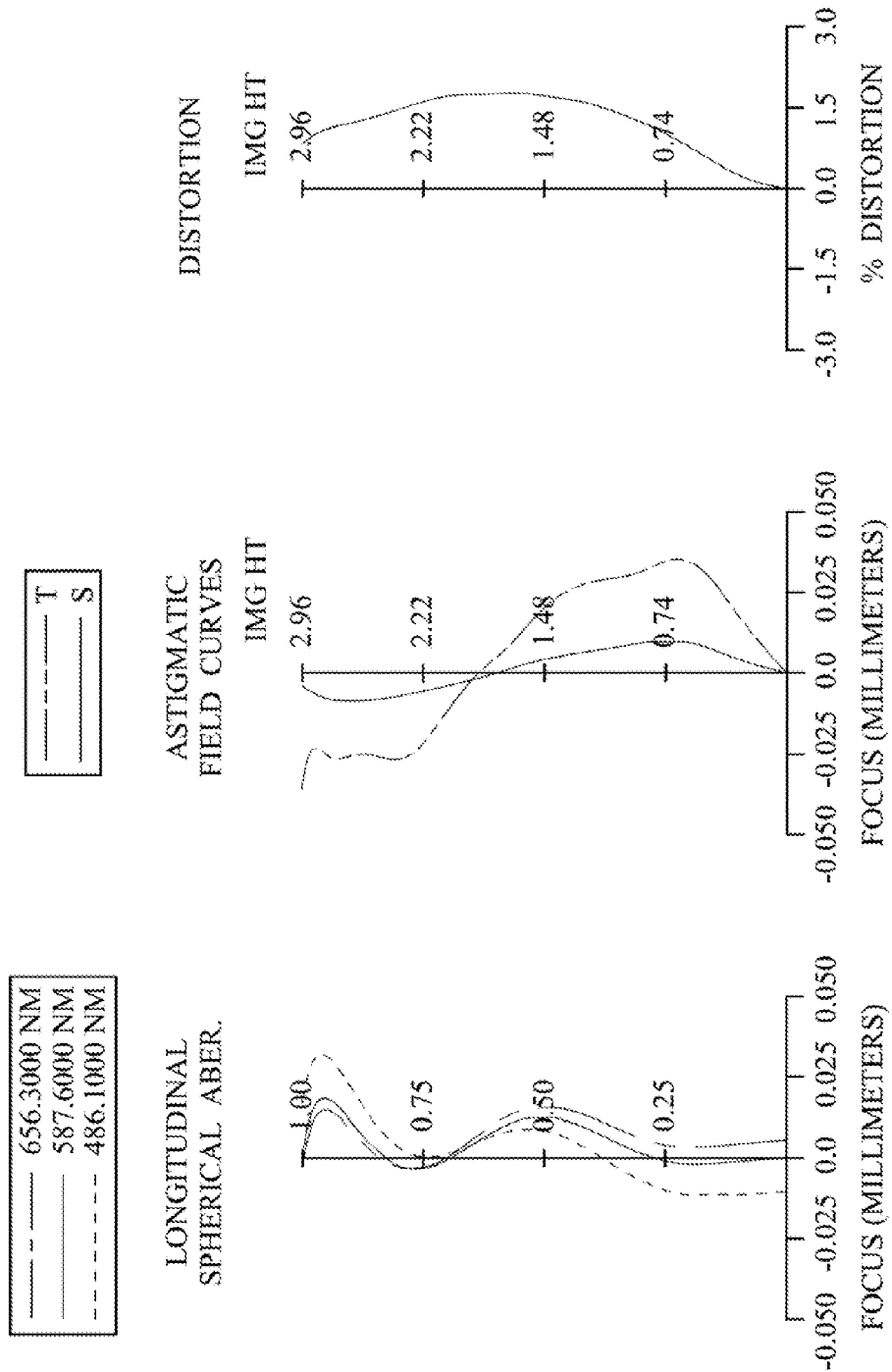
FIG. 12 shows spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows spherical aberration curves, astigmatic field curves and a distortion curve of the imaging lens assembly according to the 6th embodiment. In FIG. 11, the imaging lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670, wherein the imaging lens assembly has a total of six lens elements with refractive power.

The first lens element 610 with positive refractive power has a convex object-side surface 611 and a concave image-side surface 612. The first lens element 610 is made of plastic material, and has the object-side surface 611 and the image-side surface 612 being both aspheric.

The second lens element 620 with positive refractive power has a convex object-side surface 621 and a concave image-side surface 622. The second lens element 620 is made of plastic material, and has the object-side surface 621 and the image-side surface 622 being both aspheric.

The third lens element 630 with positive refractive power has a concave object-side surface 631 and a convex image-side surface 632. The third lens element 630 is made of plastic material, and has the object-side surface 631 and the image-side surface 632 being both aspheric.

The fourth lens element 640 with negative refractive power has a concave object-side surface 641 and a convex image-side surface 642. The fourth lens element 640 is made of plastic material, and has the object-side surface 641 and the image-side surface 642 being both aspheric.

The fifth lens element 650 with positive refractive power has a convex object-side surface 651 and a concave image-side surface 652, wherein the object-side surface 651 of the fifth lens element 650 changes from convex at a paraxial region thereof to concave at a peripheral region thereof. The fifth lens element 650 is made of plastic material, and has the object-side surface 651 and the image-side surface 652 being both aspheric.

The sixth lens element 660 with negative refractive power has a convex object-side surface 661 and a concave image-side surface 662. The sixth lens element 660 is made of plastic material, and has the object-side surface 661 and the image-side surface 662 being both aspheric. Furthermore, the sixth lens element 660 has inflection points on the object-side surface 661 and the image-side surface 662 thereof.

The IR-cut filter 680 is made of glass material and located between the sixth lens element 660 and the image plane 670, and will not affect the focal length of the imaging lens assembly.

The detailed optical data of the 6th embodiment are shown in Table 11 and the aspheric surface data are shown in Table 12 below.

TABLE 11

6th Embodiment
f = 3.25 mm, Fno = 2.08, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.164 | | | | |
| 2 | Lens 1 | 1.797 | ASP | 0.389 | Plastic | 1.544 | 55.9 | 6.21 |
| 3 | | 3.546 | ASP | 0.159 | | | | |
| 4 | Lens 2 | 1.947 | ASP | 0.240 | Plastic | 1.640 | 23.3 | 110.04 |
| 5 | | 1.906 | ASP | 0.240 | | | | |
| 6 | Lens 3 | −100.000 | ASP | 0.725 | Plastic | 1.544 | 55.9 | 2.99 |
| 7 | | −1.603 | ASP | 0.145 | | | | |
| 8 | Lens 4 | −0.747 | ASP | 0.439 | Plastic | 1.640 | 23.3 | −2.95 |
| 9 | | −1.519 | ASP | 0.025 | | | | |
| 10 | Lens 5 | 1.932 | ASP | 0.522 | Plastic | 1.544 | 55.9 | 4.08 |
| 11 | | 13.541 | ASP | 0.102 | | | | |
| 12 | Lens 6 | 1.533 | ASP | 0.491 | Plastic | 1.544 | 55.9 | −8.54 |
| 13 | | 1.026 | ASP | 0.600 | | | | |
| 14 | IR-cut filter | Plano | | 0.175 | Glass | 1.517 | 64.2 | — |
| 15 | | Plano | | 0.508 | | | | |
| 16 | Image | Plano | | — | | | | |

Note:
Reference wavelength (d-line) is 587 nm.

TABLE 12

Aspheric Coefficients

| Surface # | 2 | 3 | 4 | 5 | 6 | 7 |
|---|---|---|---|---|---|---|
| k = | 1.0448E+00 | 6.3222E+00 | −3.2528E−01 | −2.5993E+00 | −5.0000E+01 | −2.5143E+00 |
| A4 = | −1.4762E−02 | −1.4757E−01 | −1.9979E−01 | −5.9899E−02 | −4.8601E−02 | −1.3214E−01 |
| A6 = | −7.1968E−02 | 3.2300E−02 | −4.2647E−01 | −2.3586E−01 | 1.3391E−01 | 5.7407E−02 |
| A8 = | 4.1607E−01 | −2.7396E−02 | 1.5508E+00 | 4.2700E−01 | −5.2906E−01 | 5.9123E−02 |
| A10 = | −1.2418E+00 | −2.4487E−01 | −3.6755E+00 | −5.0443E−01 | 7.4068E−01 | −1.8868E−01 |
| A12 = | 1.6585E+00 | 2.5624E−01 | 4.1782E+00 | 3.0869E−01 | −5.6201E−01 | 1.0685E−01 |
| A14 = | −9.6108E−01 | −2.7911E−01 | −2.1325E+00 | −1.2006E−01 | 1.7720E−01 | 9.1544E−04 |

| Surface # | 8 | 9 | 10 | 11 | 12 | 13 |
|---|---|---|---|---|---|---|
| k = | −1.4977E+00 | −1.0105E+00 | −1.1337E+01 | −3.7892E+01 | −6.2123E+00 | −3.7590E+00 |
| A4 = | 1.3567E−01 | −6.4033E−02 | 7.3038E−02 | 2.3079E−01 | −1.3905E−01 | −1.3469E−01 |
| A6 = | −2.0190E−01 | 1.3916E−01 | −1.0568E−01 | −2.9954E−01 | −1.7286E−02 | 4.8982E−02 |
| A8 = | 4.3130E−01 | −1.1851E−01 | 1.6839E−01 | 1.6039E−01 | 3.8635E−02 | −6.7292E−03 |
| A10 = | −4.4782E−01 | 1.1078E−01 | 2.4936E−02 | −5.1017E−02 | −1.3110E−02 | −7.4220E−04 |
| A12 = | 2.6414E−01 | −5.0069E−02 | −1.9072E−02 | 9.6524E−03 | 2.0604E−03 | 3.6564E−04 |
| A14 = | −6.8539E−02 | 7.7839E−03 | 5.5879E−03 | −9.1929E−04 | −1.5880E−04 | −4.4271E−05 |
| A16 = | | | −5.9566E−04 | 2.7992E−05 | 4.8041E−06 | 1.8506E−06 |

In the imaging lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.25 | f/f3 | 1.09 |
| Fno | 2.08 | f/f6 | −0.38 |
| HFOV (deg.) | 42.0 | f3/f1 | 0.48 |
| (V2 + V4)/V6 | 0.83 | ΣCT/TD | 0.81 |
| CT2/T12 | 1.51 | SD11/SD62 | 0.32 |
| (T56 + CT6)/CT5 | 1.14 | Yc51/Yc62 | 0.72 |
| (R5 + R6)/(R5 − R6) | 1.03 | TL (mm) | 4.76 |
| (R9 + R10)/(R9 − R10) | −1.33 | | |

7th Embodiment

Figure 13:
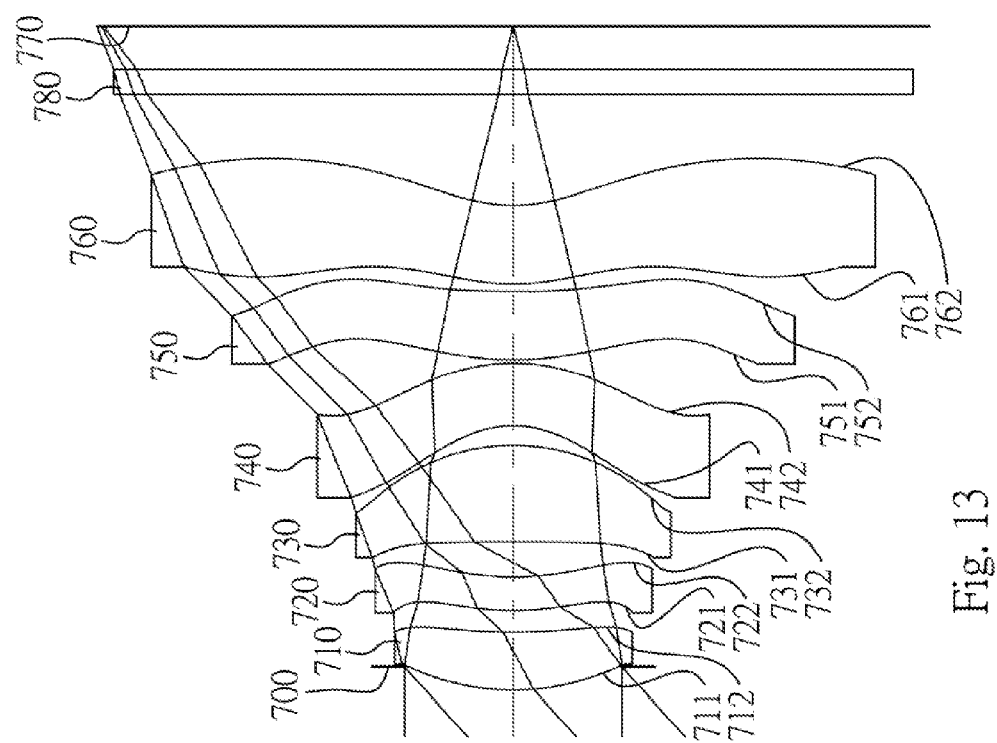
FIG. 13 is a schematic view of an imaging lens assembly according to the 7th embodiment of the present disclosure.
Figure 14:
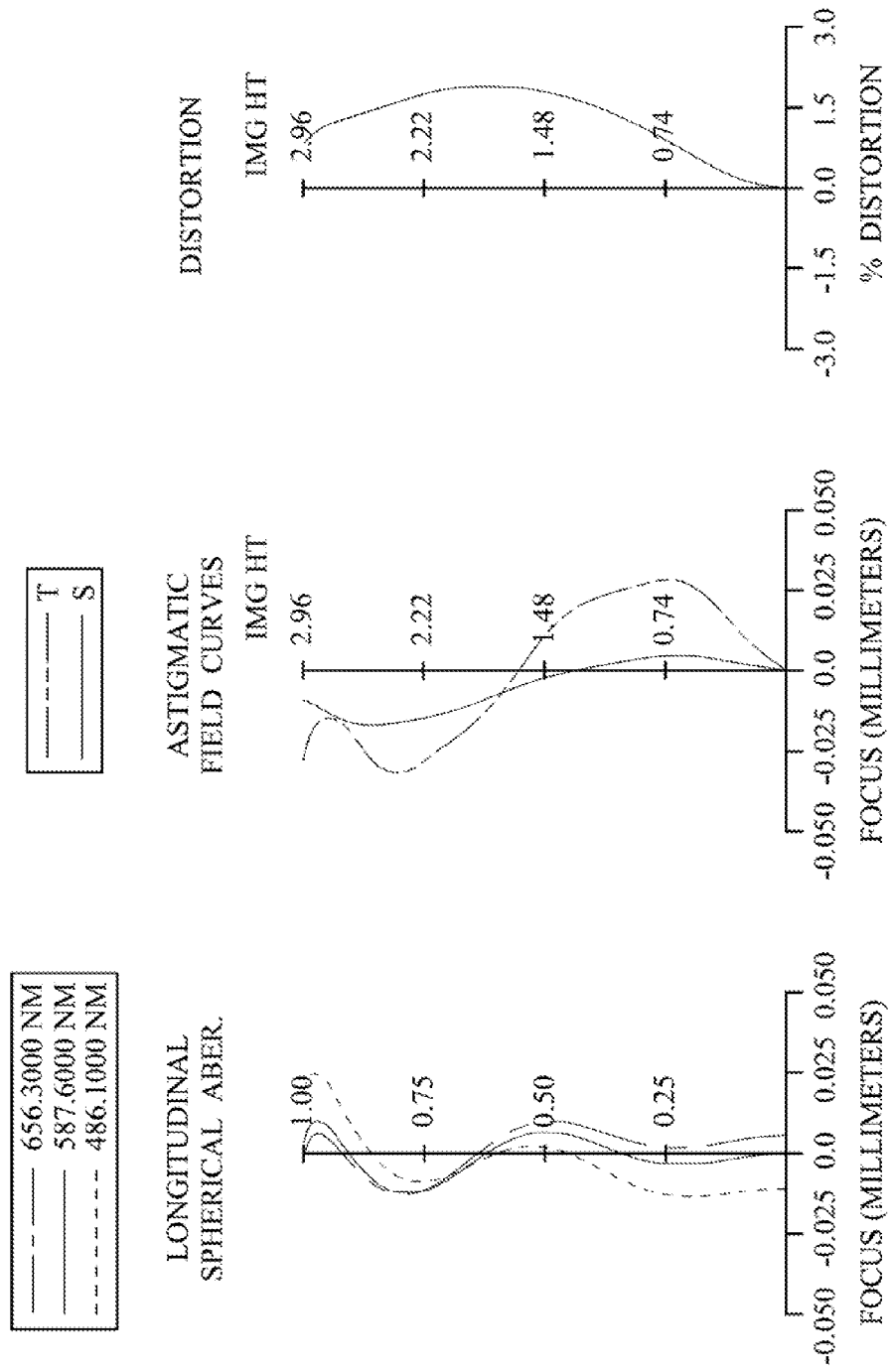
FIG. 14 shows spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows spherical aberration curves, astigmatic field curves and a distortion curve of the imaging lens assembly according to the 7th embodiment. In FIG. 13, the imaging lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 780 and an image plane 770, wherein the imaging lens assembly has a total of six lens elements with refractive power.

The first lens element 710 with positive refractive power has a convex object-side surface 711 and a concave image-side surface 712. The first lens element 710 is made of plastic material, and has the object-side surface 711 and the image-side surface 712 being both aspheric.

The second lens element 720 with positive refractive power has a convex object-side surface 721 and a concave image-side surface 722. The second lens element 720 is made of plastic material, and has the object-side surface 721 and the image-side surface 722 being both aspheric.

The third lens element 730 with positive refractive power has a concave object-side surface 731 and a convex image-side surface 732. The third lens element 730 is made of plastic material, and has the object-side surface 731 and the image-side surface 732 being both aspheric.

The fourth lens element 740 with negative refractive power has a concave object-side surface 741 and a convex image-side surface 742. The fourth lens element 740 is made of plastic material, and has the object-side surface 741 and the image-side surface 742 being both aspheric.

The fifth lens element 750 with positive refractive power has a convex object-side surface 751 and a concave image-side surface 752, wherein the object-side surface 751 of the fifth lens element 750 changes from convex at a paraxial region thereof to concave at a peripheral region thereof. The fifth lens element 750 is made of plastic material, and has the object-side surface 751 and the image-side surface 752 being both aspheric.

The sixth lens element 760 with negative refractive power has a convex object-side surface 761 and a concave image-side surface 762. The sixth lens element 760 is made of plastic material, and has the object-side surface 761 and the image-side surface 762 being both aspheric. Furthermore, the sixth lens element 760 has inflection points on the object-side surface 761 and the image-side surface 762 thereof.

The IR-cut filter 780 is made of glass material and located between the sixth lens element 760 and the image plane 770, and will not affect the focal length of the imaging lens assembly.

The detailed optical data of the 7th embodiment are shown in Table 13 and the aspheric surface data are shown in Table 14 below.

TABLE 13

7th Embodiment
f = 3.25 mm, Fno = 2.08, HFOV = 42.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.166 | | | | |
| 2 | Lens 1 | 1.795 | ASP | 0.417 | Plastic | 1.544 | 55.9 | 6.19 |
| 3 | | 3.531 | ASP | 0.157 | | | | |
| 4 | Lens 2 | 1.961 | ASP | 0.240 | Plastic | 1.640 | 23.3 | 109.87 |
| 5 | | 1.921 | ASP | 0.253 | | | | |
| 6 | Lens 3 | −65.520 | ASP | 0.694 | Plastic | 1.544 | 55.9 | 2.81 |
| 7 | | −1.502 | ASP | 0.142 | | | | |
| 8 | Lens 4 | −0.720 | ASP | 0.447 | Plastic | 1.640 | 23.3 | −3.01 |
| 9 | | −1.427 | ASP | 0.025 | | | | |
| 10 | Lens 5 | 2.221 | ASP | 0.490 | Plastic | 1.544 | 55.9 | 4.88 |
| 11 | | 12.498 | ASP | 0.053 | | | | |
| 12 | Lens 6 | 1.593 | ASP | 0.567 | Plastic | 1.544 | 55.9 | −11.46 |
| 13 | | 1.110 | ASP | 0.800 | | | | |
| 14 | IR-cut filter | Plano | | 0.175 | Glass | 1.517 | 64.2 | — |
| 15 | | Plano | | 0.314 | | | | |
| 16 | Image | Plano | | — | | | | |

Note:
Reference wavelength (d-line) is 587.6 nm.

TABLE 14

Aspheric Coefficients

| Surface # | 2 | 3 | 4 | 5 | 6 | 7 |
|---|---|---|---|---|---|---|
| k = | 1.1179E+00 | 6.9230E+00 | −2.0582E−02 | −2.2847E+00 | −9.5202E+00 | −2.5181E+00 |
| A4 = | −1.4049E−02 | −1.4371E−01 | −1.9330E−01 | −5.7359E−02 | −5.0642E−02 | −1.3181E−01 |
| A6 = | −8.0215E−02 | 2.0271E−02 | −4.4918E−01 | −2.4210E−01 | 1.2925E−01 | 5.5113E−02 |
| A8 = | 4.3139E−01 | −2.1290E−02 | 1.5557E+00 | 4.1205E−01 | −5.3984E−01 | 5.6163E−02 |
| A10 = | −1.2556E+00 | −2.8389E−01 | −3.7015E+00 | −4.9279E−01 | 7.4030E−01 | −1.8689E−01 |
| A12 = | 1.6696E+00 | 3.1944E−01 | 4.1690E+00 | 3.0398E−01 | −5.4801E−01 | 1.0949E−01 |
| A14 = | −9.5620E−01 | −3.0610E−01 | −2.1239E+00 | −1.1039E−01 | 1.7093E−01 | −3.0011E−03 |

| Surface # | 8 | 9 | 10 | 11 | 12 | 13 |
|---|---|---|---|---|---|---|
| k = | −1.5202E+00 | −1.2545E+00 | −1.6701E+01 | −3.5390E+01 | −4.0445E+50 | −3.7071E+00 |
| A4 = | 1.4076E−01 | −5.7622E−02 | 8.3101E−02 | 1.8145E−01 | −1.8650E−01 | −1.2205E−01 |
| A6 = | −1.9675E−01 | 1.3832E−01 | −1.3616E−01 | −2.2687E−01 | 6.7709E−02 | 5.3866E−02 |
| A8 = | 4.3358E−01 | −1.1992E−01 | 6.1909E−02 | 1.1748E−01 | −1.0871E−02 | −1.4666E−02 |
| A10 = | −4.4919E−01 | 1.1009E−01 | −1.2267E−02 | −3.6106E−02 | 8.5331E−04 | 2.4823E−03 |
| A12 = | 2.6090E−01 | −5.0145E−02 | −1.8249E−03 | 6.5453E−03 | −3.7132E−05 | −2.5742E−04 |
| A14 = | −6.8546E−02 | 7.9923E−03 | 1.4998E−03 | −5.9413E−04 | 2.7491E−06 | 1.5324E−05 |
| A16 = | | | −2.1227E−04 | 1.7335E−05 | −1.9372E−07 | −4.1360E−07 |

In the imaging lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following relationships:

| f (mm) | 3.25 | f/f3 | 1.16 |
|---|---|---|---|
| Fno | 2.08 | f/f6 | −0.28 |
| HFOV (deg.) | 42.1 | f3/f1 | 0.45 |
| (V2 + V4)/V6 | 0.83 | ΣCT/TD | 0.82 |
| CT2/T12 | 1.53 | SD11/SD62 | 0.31 |
| (T56 + CT6)/CT5 | 1.27 | Yc51/Yc62 | 0.64 |
| (R5 + R6)/(R5 − R6) | 1.05 | TL (mm) | 4.77 |
| (R9 + R10)/(R9 − R10) | −1.43 | | |

8th Embodiment

Figure 15:
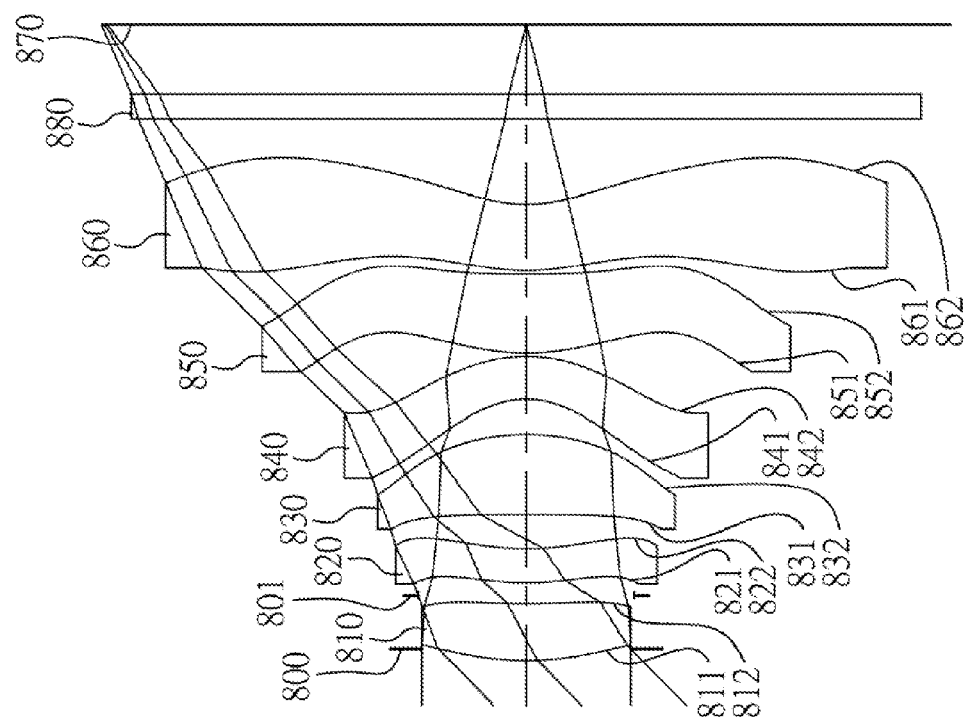
FIG. 15 is a schematic view of an imaging lens assembly according to the 8th embodiment of the present disclosure.
Figure 16:
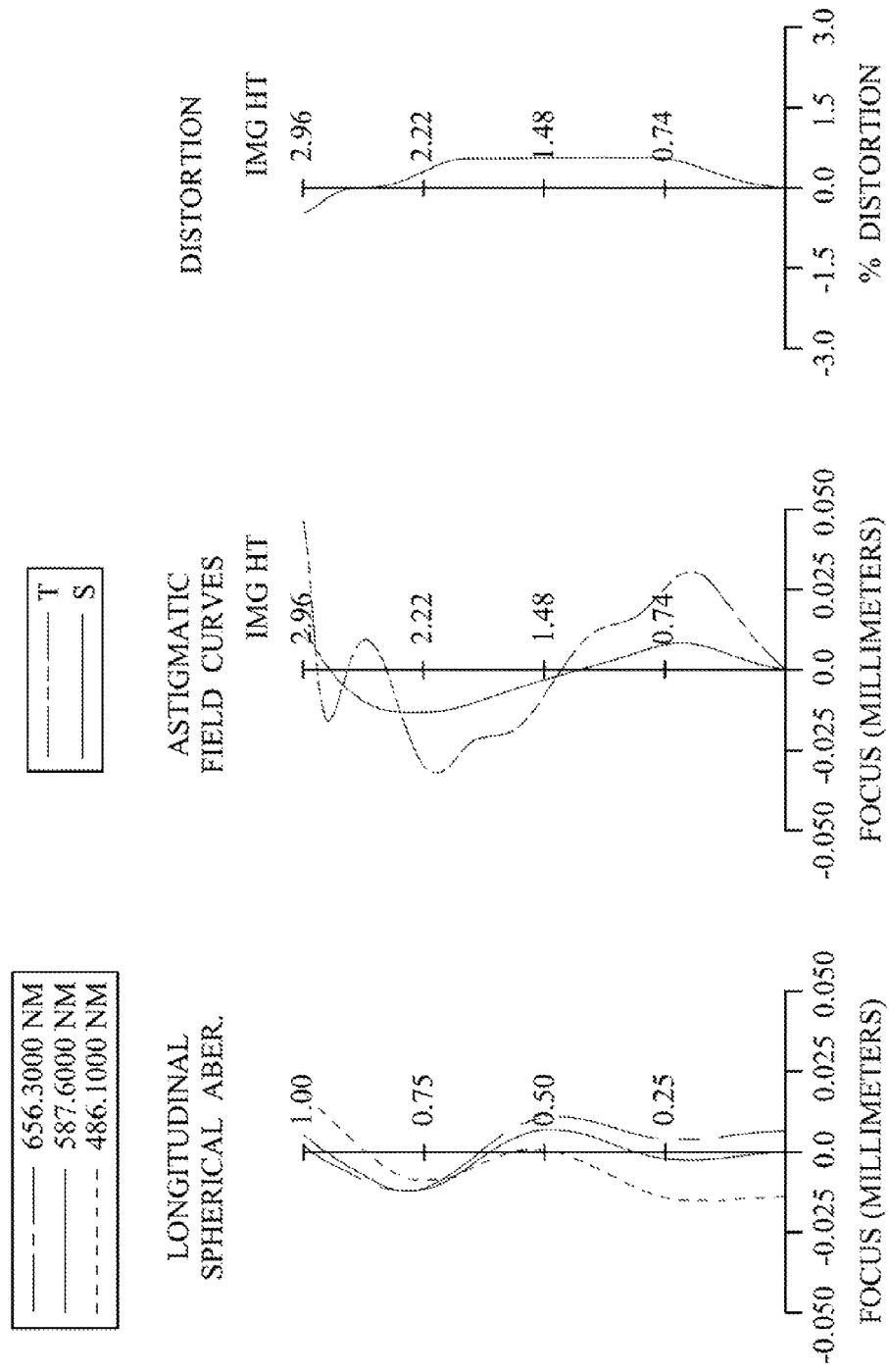
FIG. 16 shows spherical aberration curves, astigmatic field curves and a distortion curve of the imaging lens assembly according to the 8th embodiment.

FIG. 15 is a schematic view of an imaging lens assembly according to the 8th embodiment of the present disclosure. FIG. 16 shows spherical aberration curves, astigmatic field curves and a distortion curve of the imaging lens assembly according to the 8th embodiment. In FIG. 15, the imaging lens assembly includes, in order from an object side to an image side, an aperture stop 800, a first lens element 810, a stop 801, a second lens element 820, a third lens element 830, a fourth lens element 840, a fifth lens element 850, a sixth lens element 860, an IR-cut filter 880 and an image plane 870, wherein the imaging lens assembly has a total of six lens elements with refractive power.

The first lens element 810 with positive refractive power has a convex object-side surface 811 and a concave image-side surface 812. The first lens element 810 is made of plastic material, and has the object-side surface 811 and the image-side surface 812 being both aspheric.

The second lens element 820 with positive refractive power has a convex object-side surface 821 and a concave image-side surface 822. The second lens element 820 is made of plastic material, and has the object-side surface 821 and the image-side surface 822 being both aspheric.

The third lens element 830 with positive refractive power has a concave object-side surface 831 and a convex image-side surface 832. The third lens element 830 is made of plastic material, and has the object-side surface 831 and the image-side surface 832 being both aspheric.

The fourth lens element 840 with negative refractive power has a concave object-side surface 841 and a convex image-side surface 842. The fourth lens element 840 is made of plastic material, and has the object-side surface 841 and the image-side surface 842 being both aspheric.

The fifth lens element 850 with positive refractive power has a convex object-side surface 851 and a concave image-side surface 852, wherein the object-side surface 851 of the fifth lens element 850 changes from convex at a paraxial region thereof to concave at a peripheral region thereof. The fifth lens element 850 is made of plastic material, and has the object-side surface 851 and the image-side surface 852 being both aspheric.

The sixth lens element 860 with negative refractive power has a convex object-side surface 861 and a concave image-side surface 862. The sixth lens element 860 is made of plastic material, and has the object-side surface 861 and the image-side surface 862 being both aspheric. Furthermore, the sixth lens element 860 has inflection points on the object-side surface 861 and the image-side surface 862 thereof.

The IR-cut filter 880 is made of glass material and located between the sixth lens element 860 and the image plane 870, and will not affect the focal length of the imaging lens assembly.

The detailed optical data of the 8th embodiment are shown in Table 15 and the aspheric surface data are shown in Table 16 below.

TABLE 15

8th Embodiment
f = 3.05 mm, Fno = 2.08, HFOV = 44.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.081 | | | | |
| 2 | Lens 1 | 2.143 ASP | 0.400 | Plastic | 1.544 | 55.9 | 6.43 |
| 3 | | 5.166 ASP | 0.058 | | | | |
| 4 | Stop | Plano | 0.088 | | | | |
| 5 | Lens 2 | 2.010 ASP | 0.240 | Plastic | 1.640 | 23.3 | 106.16 |
| 6 | | 1.975 ASP | 0.236 | | | | |
| 7 | Lens 3 | −55.540 ASP | 0.566 | Plastic | 1.544 | 55.9 | 3.36 |
| 8 | | −1.778 ASP | 0.246 | | | | |
| 9 | Lens 4 | −0.627 ASP | 0.304 | Plastic | 1.640 | 23.3 | −2.98 |
| 10 | | −1.109 ASP | 0.025 | | | | |
| 11 | Lens 5 | 1.658 ASP | 0.552 | Plastic | 1.544 | 55.9 | 3.22 |
| 12 | | 27.989 ASP | 0.025 | | | | |
| 13 | Lens 6 | 1.606 ASP | 0.467 | Plastic | 1.544 | 55.9 | −7.10 |
| 14 | | 1.018 ASP | 0.600 | | | | |
| 15 | IR-cut filter | Plano | 0.175 | Glass | 1.517 | 64.2 | — |
| 16 | | Plano | 0.489 | | | | |
| 17 | Image | Plano | — | | | | |

Note:
Reference wavelength (d-line) is 587.6 nm.
Half of the diameter of the stop at Surface 4 is 0.76 mm.

TABLE 16

Aspheric Coefficients

| Surface # | 2 | 3 | 5 | 6 | 7 | 8 |
|---|---|---|---|---|---|---|
| k = | 3.4173E−02 | −4.8907E+01 | −1.9972E+00 | −4.2883E+00 | −2.5251E+01 | −2.3640E−01 |
| A4 = | −2.7105E−02 | −1.9682E−01 | −2.5959E−01 | −8.7011E−02 | −9.6955E−02 | −2.0602E−01 |
| A6 = | −1.1074E−01 | −8.8232E−04 | −6.1566E−01 | −3.3302E−01 | 2.6255E−01 | 1.3022E−01 |
| A8 = | 5.6624E−01 | 4.4838E−02 | 2.5157E+00 | 6.4742E−01 | −8.7336E−01 | 1.0722E−01 |
| A10 = | −1.9798E+00 | −4.5534E−01 | −6.6291E+00 | −8.7455E−01 | 1.3253E+00 | −3.4637E−01 |
| A12 = | 2.9048E+00 | 4.1686E−01 | 8.8053E+00 | 7.0626E−01 | −1.1059E+00 | 2.4117E−01 |
| A14 = | −1.8180E+00 | −1.9151E−01 | −4.8858E+00 | −3.7756E−01 | 3.6281E−01 | −2.4620E−02 |

| Surface # | 9 | 10 | 11 | 12 | 13 | 14 |
|---|---|---|---|---|---|---|
| k = | −1.3777E+00 | −1.4764E+00 | −1.1556E+01 | −2.3423E+01 | −4.5366E+00 | −4.5645E+00 |
| A4 = | 1.7487E−01 | −6.5879E−02 | 9.2653E−02 | 2.8543E−01 | −2.6370E−01 | −1.6658E−01 |
| A6 = | −2.7003E−01 | 1.9395E−01 | −2.0381E−01 | −4.3744E−01 | 1.7698E−01 | 1.1829E−01 |
| A8 = | 6.9358E−01 | −1.9110E−01 | 7.2192E−02 | 2.6478E−01 | −7.8193E−02 | −4.7997E−02 |
| A10 = | −8.1787E−01 | 2.0025E−01 | −3.3739E−03 | −9.5783E−02 | 2.2931E−02 | 1.1313E−02 |
| A12 = | 5.3928E−01 | −1.0428E−01 | −3.3328E−03 | 2.1521E−02 | −4.0714E−03 | −1.5626E−03 |
| A14 = | −1.6280E−01 | 1.9029E−02 | 9.9797E−04 | −2.6734E−03 | 3.9194E−04 | 1.1836E−04 |
| A16 = | | | −1.0735E−04 | 1.3476E−04 | −1.5693E−05 | −3.8132E−06 |

In the imaging lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.05 | f/f3 | 0.91 |
| Fno | 2.08 | f/f6 | −0.43 |
| HFOV (deg.) | 44.3 | f3/f1 | 0.52 |
| (V2 + V4)/V6 | 0.83 | ΣCT/TD | 0.79 |
| CT2/T12 | 1.64 | SD11/SD62 | 0.29 |
| (T56 + CT6)/CT5 | 0.89 | Yc51/Yc62 | 0.56 |
| (R5 + R6)/(R5 − R6) | 1.07 | TL (mm) | 4.47 |
| (R9 + R10)/(R9 − R10) | −1.13 | | |

9th Embodiment

Figure 17:
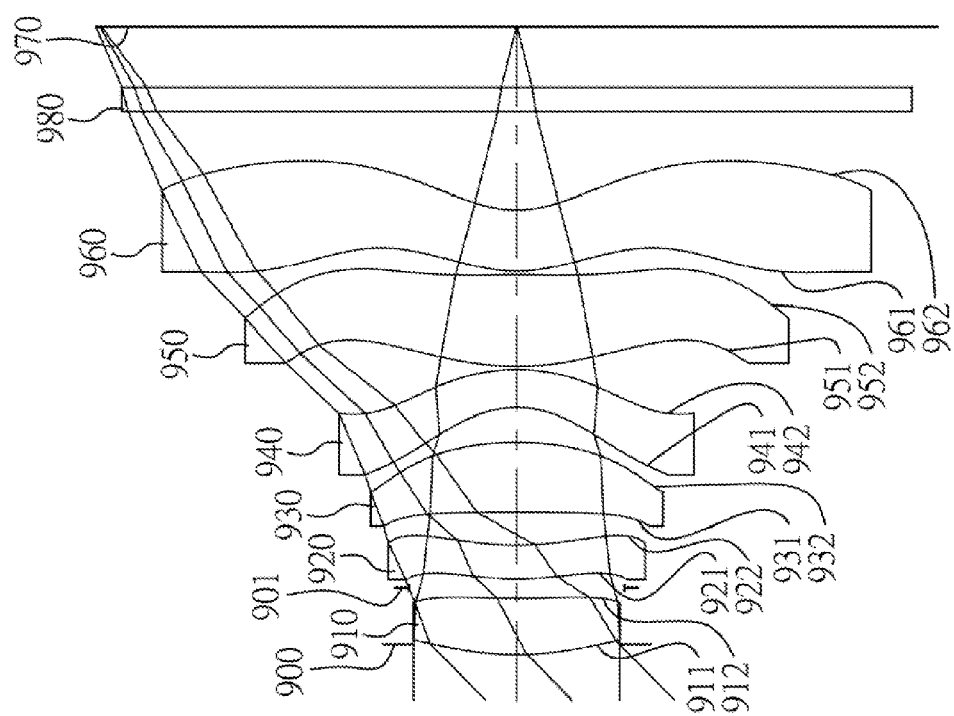
FIG. 17 is a schematic view of an imaging lens assembly according to the 9th embodiment of the present disclosure.
Figure 18:
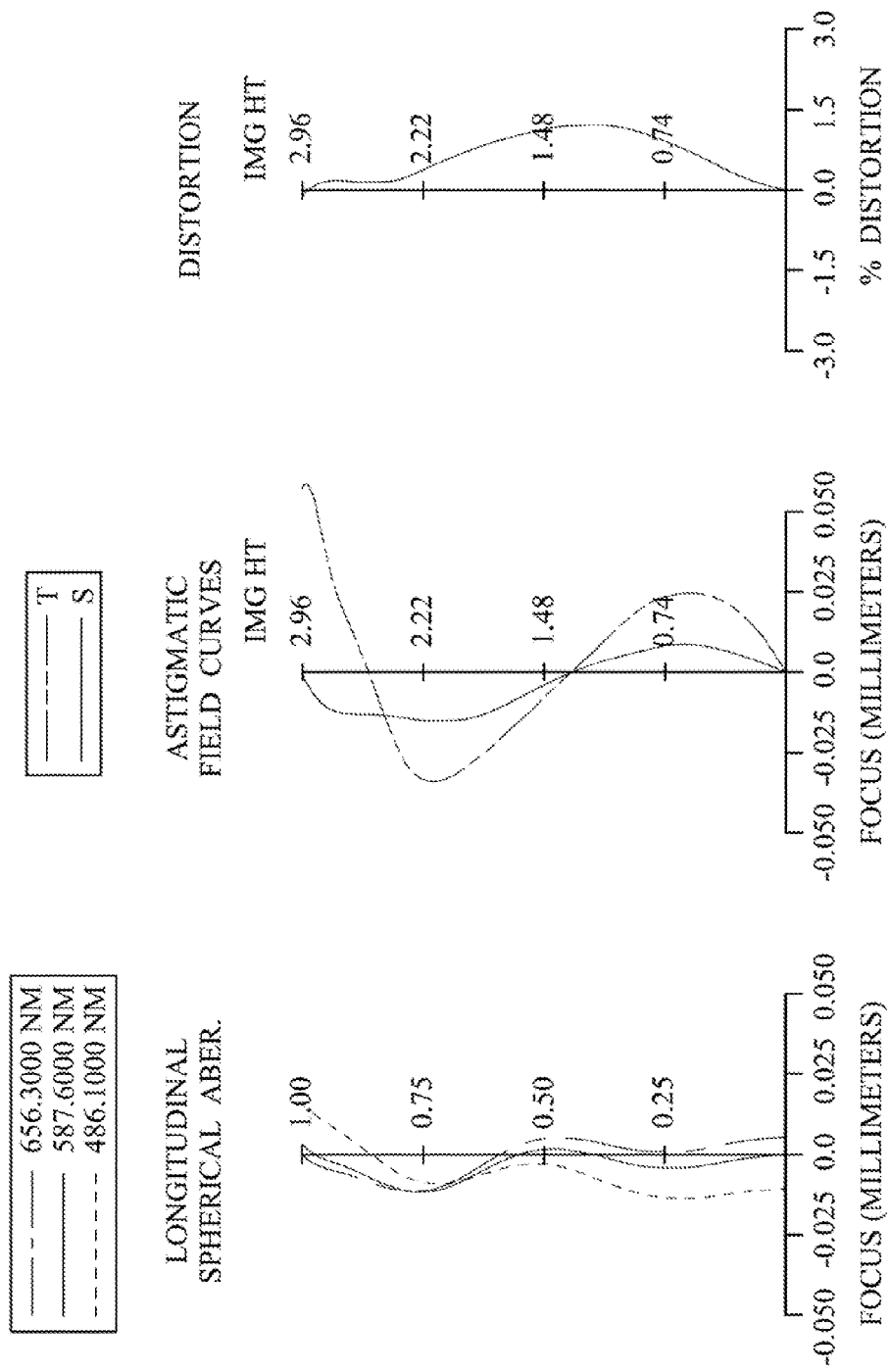
FIG. 18 shows spherical aberration curves, astigmatic field curves and a distortion curve of the imaging lens assembly according to the 9th embodiment.

FIG. 17 is a schematic view of an imaging lens assembly according to the 9th embodiment of the present disclosure. FIG. 18 shows spherical aberration curves, astigmatic field curves and a distortion curve of the imaging lens assembly according to the 9th embodiment. In FIG. 17, the imaging lens assembly includes, in order from an object side to an image side, an aperture stop 900, a first lens element 910, a stop 901, a second lens element 920, a third lens element 930, a fourth lens element 940, a fifth lens element 950, a sixth lens element 960, an IR-cut filter 980 and an image plane 970, wherein the imaging lens assembly has a total of six lens elements with refractive power.

The first lens element 910 with positive refractive power has a convex object-side surface 911 and a concave image-side surface 912. The first lens element 910 is made of plastic material, and has the object-side surface 911 and the image-side surface 912 being both aspheric.

The second lens element 920 with positive refractive power has a convex object-side surface 921 and a concave image-side surface 922. The second lens element 920 is made of plastic material, and has the object-side surface 921 and the image-side surface 922 being both aspheric.

The third lens element 930 with positive refractive power has a concave object-side surface 931 and a convex image-side surface 932. The third lens element 930 is made of plastic material, and has the object-side surface 931 and the image-side surface 932 being both aspheric.

The fourth lens element 940 with negative refractive power has a concave object-side surface 941 and a convex image-side surface 942. The fourth lens element 940 is made of plastic material, and has the object-side surface 941 and the image-side surface 942 being both aspheric.

The fifth lens element 950 with positive refractive power has a convex object-side surface 951 and a convex image-side surface 952, wherein the object-side surface 951 of the fifth lens element 950 changes from convex at a paraxial region thereof to concave at a peripheral region thereof. The fifth lens element 950 is made of plastic material, and has the object-side surface 951 and the image-side surface 952 being both aspheric.

The sixth lens element 960 with negative refractive power has a convex object-side surface 961 and a concave image-side surface 962. The sixth lens element 960 is made of plastic material, and has the object-side surface 961 and the image-side surface 962 being both aspheric. Furthermore, the sixth lens element 960 has inflection points on the object-side surface 961 and the image-side surface 962 thereof.

The IR-cut filter 980 is made of glass material and located between the sixth lens element 960 and the image plane 970, and will not affect the focal length of the imaging lens assembly.

The detailed optical data of the 9th embodiment are shown in Table 17 and the aspheric surface data are shown in Table 18 below.

TABLE 17

9th Embodiment
f = 3.04 mm, Fno = 2.08, HFOV = 44.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.073 | | | | |
| 2 | Lens 1 | 2.224 | ASP | 0.400 | Plastic | 1.544 | 55.9 | 6.27 |
| 3 | | 5.972 | ASP | 0.074 | | | | |
| 4 | Stop | Plano | | 0.064 | | | | |
| 5 | Lens 2 | 2.205 | ASP | 0.240 | Plastic | 1.640 | 23.3 | 102.66 |
| 6 | | 2.185 | ASP | 0.230 | | | | |
| 7 | Lens 3 | −97.662 | ASP | 0.500 | Plastic | 1.544 | 55.9 | 4.43 |
| 8 | | −2.357 | ASP | 0.246 | | | | |
| 9 | Lens 4 | −0.730 | ASP | 0.270 | Plastic | 1.640 | 23.3 | −2.85 |
| 10 | | −1.393 | ASP | 0.025 | | | | |
| 11 | Lens 5 | 1.959 | ASP | 0.650 | Plastic | 1.544 | 55.9 | 2.93 |
| 12 | | −7.613 | ASP | 0.025 | | | | |
| 13 | Lens 6 | 1.091 | ASP | 0.435 | Plastic | 1.544 | 55.9 | −10.18 |
| 14 | | 0.784 | ASP | 0.700 | | | | |
| 15 | IR-cut filter | Plano | | 0.175 | Glass | 1.517 | 64.2 | — |
| 16 | | Plano | | 0.430 | | | | |
| 17 | Image | Plano | | — | | | | |

Note:
Reference wavelength (d-line) is 587.6 nm.
Half of the diameter of the stop at Surface 4 is 0.765 mm.

TABLE 18

Aspheric Coefficients

| Surface # | 2 | 3 | 5 | 6 | 7 | 8 |
|---|---|---|---|---|---|---|
| k = | 5.8071E−02 | −3.3912E+01 | −2.6383E−01 | −3.8108E+00 | −5.0000E+01 | −2.4578E−01 |
| A4 = | −2.8397E−02 | −2.0038E−01 | −2.3632E−01 | −7.2508E−02 | −8.8098E−02 | −2.0813E−01 |
| A6 = | −1.1211E−01 | −3.9211E−02 | −6.4379E−01 | −3.1490E−01 | 2.5325E−01 | 1.3136E−01 |
| A8 = | 5.2172E−01 | 1.0742E−01 | 2.5601E+00 | 5.9260E−01 | −8.9380E−01 | 1.0315E−01 |
| A10 = | −1.9095E+00 | −4.8501E−01 | −6.6599E+00 | −8.4762E−01 | 1.3353E+00 | −3.5988E−01 |
| A12 = | 2.9281E+00 | 4.1686E−01 | 8.8053E+00 | 7.0626E−01 | −1.1134E+00 | 2.3183E−01 |
| A14 = | −1.8972E+00 | −1.9151E−01 | −4.4858E+00 | −3.7756E−01 | 3.8403E−01 | −1.2437E−02 |

| Surface # | 9 | 10 | 11 | 12 | 13 | 14 |
|---|---|---|---|---|---|---|
| k = | −1.3533E+00 | −1.3746E+00 | −8.1357E+00 | −1.0560E+00 | −4.5366E+00 | −3.4099E+00 |
| A4 = | 3.4487E−02 | −1.8088E−01 | 8.9871E−03 | 3.1489E−01 | −1.6867E−01 | −1.5530E−01 |
| A6 = | 2.9079E−02 | 3.5319E−01 | −3.7957E−03 | −3.4839E−01 | 1.2365E−02 | 6.2451E−02 |

TABLE 18-continued

| Aspheric Coefficients | | | | | | |
|---|---|---|---|---|---|---|
| A8 = | 7.2794E−01 | −1.6601E−01 | −7.0657E−02 | 1.8617E−01 | 2.2458E−02 | −1.3397E−02 |
| A10 = | −1.3376E+00 | 5.6135E−02 | 7.2612E−02 | −6.0038E−02 | −8.4859E−03 | 1.1600E−03 |
| A12 = | 9.8676E−01 | −2.3436E−02 | −3.4749E−02 | 1.1506E−02 | 1.3551E−03 | 7.7041E−05 |
| A14 = | −2.8417E−01 | 4.9137E−03 | 8.1045E−03 | −1.1887E−03 | −1.0533E−04 | −2.2280E−05 |
| A16 = | | | −7.2479E−04 | 5.0741E−05 | 3.2845E−06 | 1.1761E−06 |

In the imaging lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following relationships:

| f (mm) | 3.04 | f/f3 | 0.69 |
|---|---|---|---|
| Fno | 2.08 | f/f6 | −0.30 |
| HFOV (deg.) | 44.3 | f3/f1 | 0.71 |
| (V2 + V4)/V6 | 0.83 | ΣCT/TD | 0.79 |
| CT2/T12 | 1.74 | SD11/SD62 | 0.29 |
| (T56 + CT6)/CT5 | 0.71 | Yc51/Yc62 | 0.79 |
| (R5 + R6)/(R5 − R6) | 1.05 | TL (mm) | 4.46 |
| (R9 + R10)/(R9 − R10) | −0.59 | | |

10th Embodiment

Figure 19:
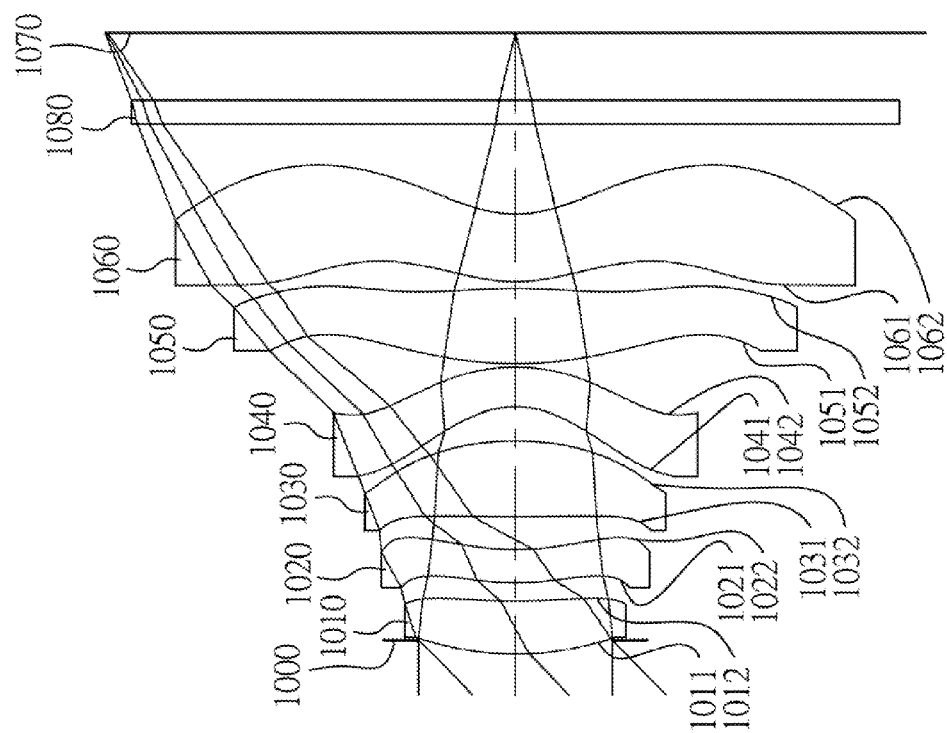
FIG. 19 is a schematic view of an imaging lens assembly according to the 10th embodiment of the present disclosure.
Figure 20:
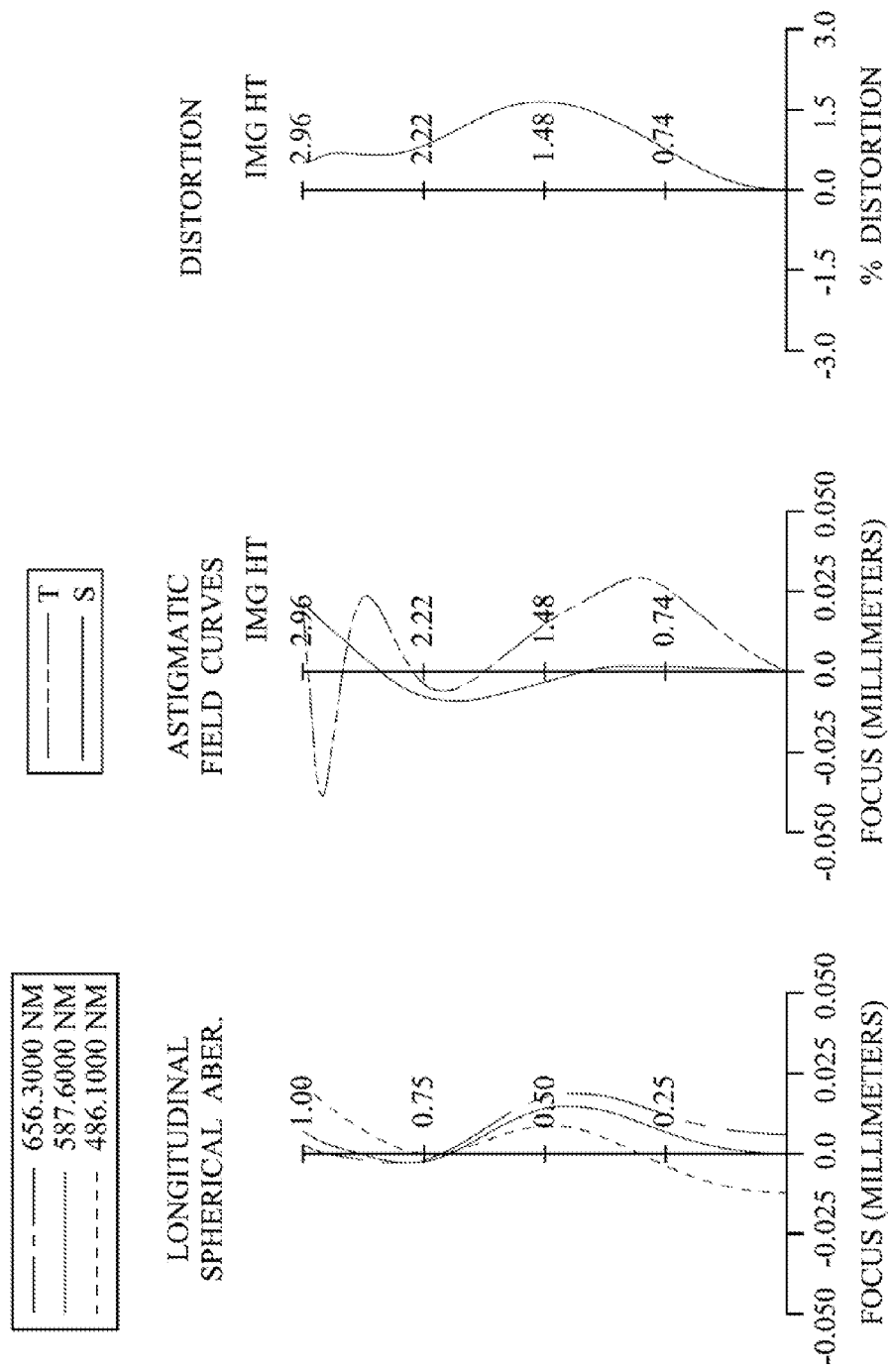
FIG. 20 shows spherical aberration curves, astigmatic field curves and a distortion curve of the imaging lens assembly according to the 10th embodiment.

FIG. 19 is a schematic view of an imaging lens assembly according to the 10th embodiment of the present disclosure. FIG. 20 shows spherical aberration curves, astigmatic field curves and a distortion curve of the imaging lens assembly according to the 10th embodiment. In FIG. 19, the imaging lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080 and an image plane 1070, wherein the imaging lens assembly has a total of six lens elements with refractive power.

The first lens element 1010 with positive refractive power has a convex object-side surface 1011 and a concave image-side surface 1012. The first lens element 1010 is made of plastic material, and has the object-side surface 1011 and the image-side surface 1012 being both aspheric.

The second lens element 1020 with positive refractive power has a convex object-side surface 1021 and a concave image-side surface 1022. The second lens element 1020 is made of plastic material, and has the object-side surface 1021 and the image-side surface 1022 being both aspheric.

The third lens element 1030 with positive refractive power has a convex object-side surface 1031 and a convex image-side surface 1032. The third lens element 1030 is made of plastic material, and has the object-side surface 1031 and the image-side surface 1032 being both aspheric.

The fourth lens element 1040 with negative refractive power has a concave object-side surface 1041 and a convex image-side surface 1042. The fourth lens element 1040 is made of plastic material, and has the object-side surface 1041 and the image-side surface 1042 being both aspheric.

The fifth lens element 1050 with positive refractive power has a convex object-side surface 1051 and a convex image-side surface 1052, wherein the object-side surface 1051 of the fifth lens element 1050 changes from convex at a paraxial region thereof to concave at a peripheral region thereof. The fifth lens element 1050 is made of plastic material, and has the object-side surface 1051 and the image-side surface 1052 being both aspheric.

The sixth lens element 1060 with negative refractive power has a convex object-side surface 1061 and a concave image-side surface 1062. The sixth lens element 1060 is made of plastic material, and has the object-side surface 1061 and the image-side surface 1062 being both aspheric. Furthermore, the sixth lens element 1060 has inflection points on the object-side surface 1061 and the image-side surface 1062 thereof.

The IR-cut filter 1080 is made of glass material and located between the sixth lens element 1060 and the image plane 1070, and will not affect the focal length of the imaging lens assembly.

The detailed optical data of the 10th embodiment are shown in Table 19 and the aspheric surface data are shown in Table 20 below.

TABLE 19

10th Embodiment
f = 3.02 mm, Fno = 2.15, HFOV = 44.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.104 | | | | |
| 2 | Lens 1 | 2.032 | ASP | 0.386 | Plastic | 1.544 | 55.9 | 7.36 |
| 3 | | 3.846 | ASP | 0.134 | | | | |
| 4 | Lens 2 | 1.875 | ASP | 0.240 | Plastic | 1.640 | 23.3 | 101.98 |
| 5 | | 1.834 | ASP | 0.234 | | | | |
| 6 | Lens 3 | 16.285 | ASP | 0.552 | Plastic | 1.544 | 55.9 | 3.69 |
| 7 | | −2.261 | ASP | 0.245 | | | | |
| 8 | Lens 4 | −0.700 | ASP | 0.290 | Plastic | 1.640 | 23.3 | −2.86 |
| 9 | | −1.317 | ASP | 0.025 | | | | |
| 10 | Lens 5 | 2.758 | ASP | 0.543 | Plastic | 1.544 | 55.9 | 3.02 |
| 11 | | −3.791 | ASP | 0.047 | | | | |
| 12 | Lens 6 | 1.208 | ASP | 0.494 | Plastic | 1.544 | 55.9 | −10.08 |
| 13 | | 0.848 | ASP | 0.650 | | | | |

TABLE 19-continued

10th Embodiment
f = 3.02 mm, Fno = 2.15, HFOV = 44.3 deg.

| Surface # | | Curvature Radius | Thickness | Material | Index | Abbe # | Focal Length |
|---|---|---|---|---|---|---|---|
| 14 | IR-cut filter | Plano | 0.175 | Glass | 1.517 | 64.2 | — |
| 15 | | Plano | 0.486 | | | | |
| 16 | Image | Plano | — | | | | |

Note:
Reference wavelength (d-line) is 587.6 nm.

TABLE 20

Aspheric Coefficients

| Surface # | 2 | 3 | 4 | 5 | 6 | 7 |
|---|---|---|---|---|---|---|
| k = | 7.7372E−01 | −6.7202E+00 | −1.7943E+00 | −4.4472E+00 | −4.9948E+01 | −1.5694E+00 |
| A4 = | −1.7710E−02 | −2.0911E−01 | −3.1723E−01 | −1.0267E−01 | −8.7327E−02 | −1.9293E−01 |
| A6 = | −1.0778E−01 | 9.1587E−02 | −1.6399E−01 | −2.1264E−01 | 2.9630E−01 | 1.5406E−01 |
| A8 = | 6.3436E−01 | 4.2868E−02 | 9.6420E−01 | 5.0269E−01 | −9.2810E−01 | 9.5388E−02 |
| A10 = | −2.0914E+00 | −5.9932E−01 | −3.2985E+00 | −7.5207E−01 | 1.3710E+00 | −3.7655E−01 |
| A12 = | 3.1494E+00 | 4.1686E−01 | 5.0837E+00 | 6.4664E−01 | −1.0317E+00 | 2.2853E−01 |
| A14 = | −2.0293E+00 | −1.9151E−01 | −3.5278E+00 | −3.8591E−01 | 2.3191E−01 | −1.6526E−02 |

| Surface # | 8 | 9 | 10 | 11 | 12 | 13 |
|---|---|---|---|---|---|---|
| k = | −1.3634E+00 | −1.3716E+00 | −2.0027E+01 | −2.7487E−01 | −4.5366E+00 | −3.2079E+00 |
| A4 = | 7.0197E−03 | −1.5602E−01 | 7.4738E−02 | 2.1626E−01 | −2.0343E−01 | −1.5405E−01 |
| A6 = | 2.9175E−01 | 4.6782E−01 | −5.1211E−02 | −1.1348E−01 | 9.7069E−02 | 8.1502E−02 |
| A8 = | −4.7602E−02 | −5.5502E−01 | 7.0663E−03 | 2.4288E−02 | −4.6786E−02 | −3.4258E−02 |
| A10 = | −3.9422E−01 | 4.3054E−01 | −9.5526E−05 | −1.9282E−03 | 1.9100E−02 | 9.7031E−03 |
| A12 = | 4.5394E−01 | −1.6885E−01 | | | −4.5274E−03 | −1.7024E−03 |
| A14 = | −1.5552E−01 | 2.4655E−02 | | | 5.4419E−04 | 1.6589E−04 |
| A16 = | | | | | −2.6084E−05 | −6.8273E−06 |

In the imaging lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following relationships:

| f (mm) | 3.02 | f/f3 | 0.82 |
|---|---|---|---|
| Fno | 2.15 | f/f6 | −0.30 |
| HFOV (deg.) | 44.3 | f3/f1 | 0.50 |
| (V2 + V4)/V6 | 0.83 | ΣCT/TD | 0.79 |
| CT2/T12 | 1.79 | SD11/SD62 | 0.29 |
| (T56 + CT6)/CT5 | 1.00 | Yc51/Yc62 | 0.96 |
| (R5 + R6)/(R5 − R6) | 0.76 | TL (mm) | 4.50 |
| (R9 + R10)/(R9 − R10) | −0.16 | | |

11th Embodiment

Figure 21:
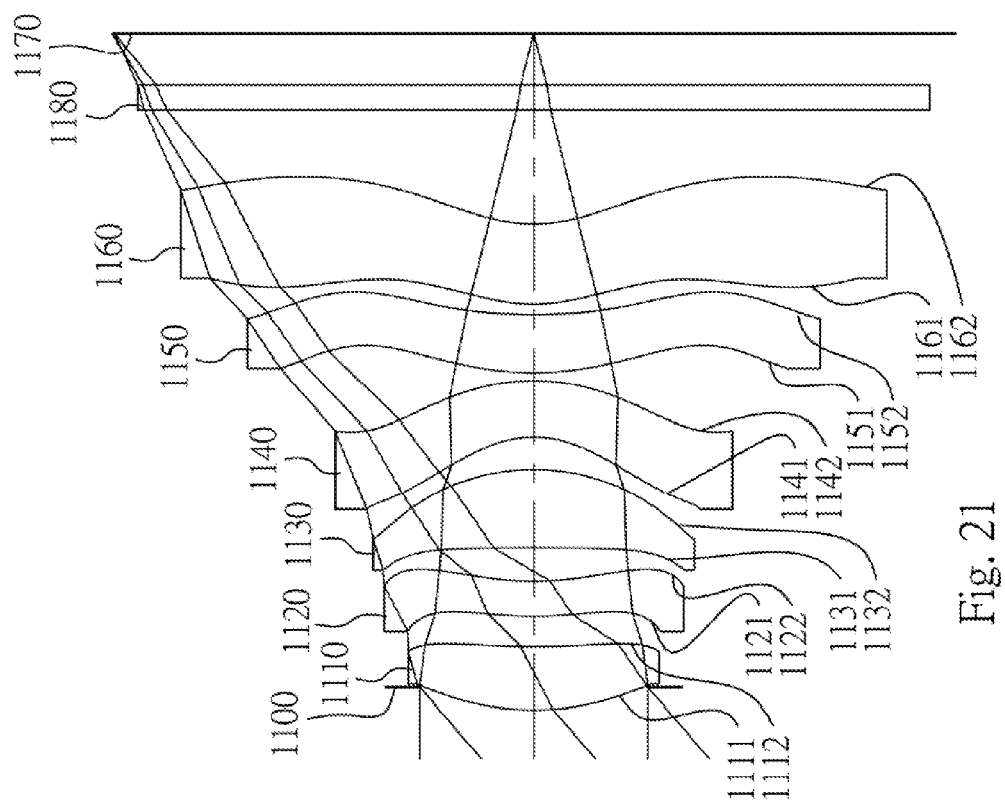
FIG. 21 is a schematic view of an imaging lens assembly according to the 11th embodiment of the present disclosure.
Figure 22:
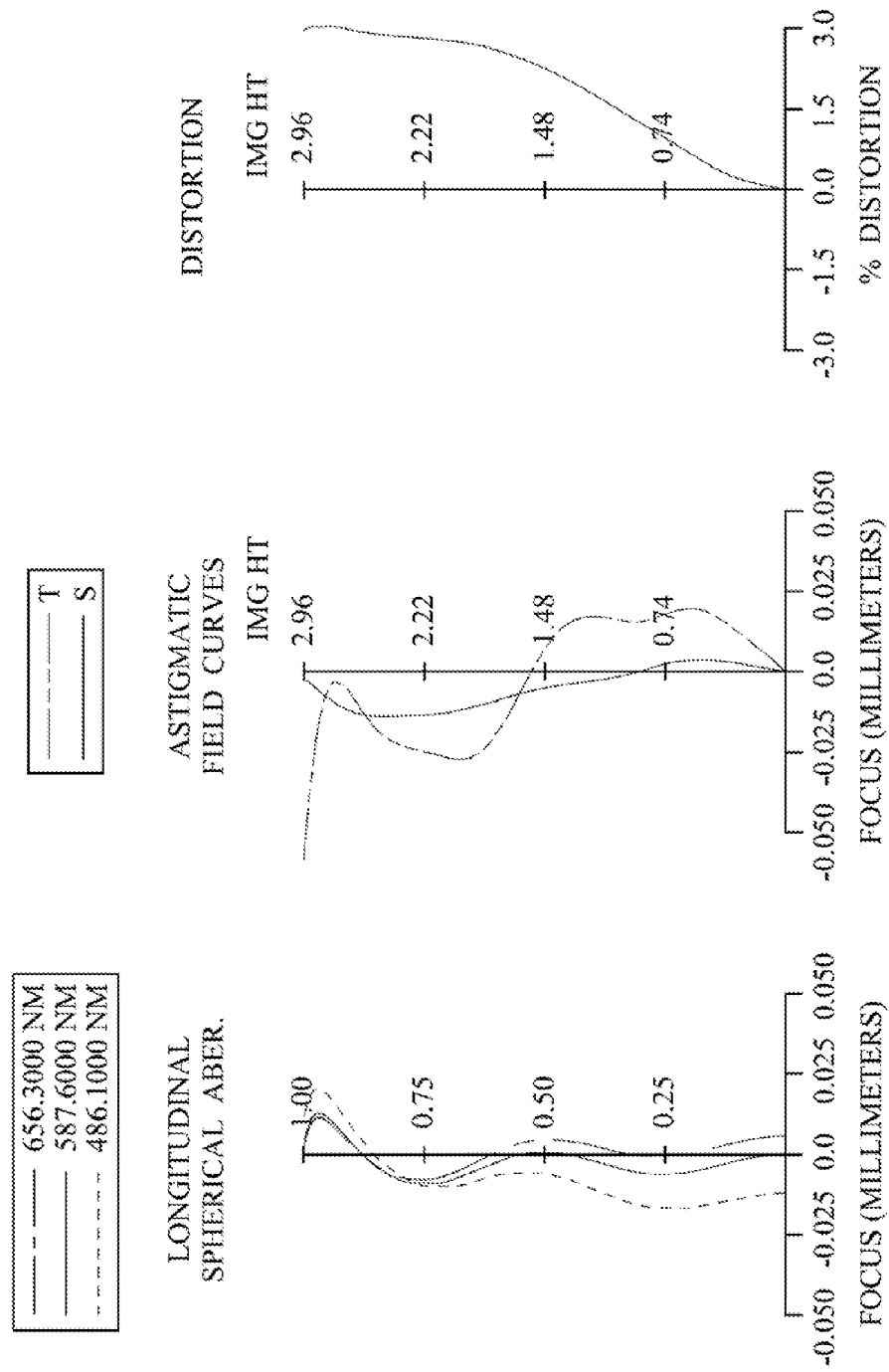
FIG. 22 shows spherical aberration curves, astigmatic field curves and a distortion curve of the imaging lens assembly according to the 11th embodiment.

FIG. 21 is a schematic view of an imaging lens assembly according to the 11th embodiment of the present disclosure. FIG. 22 shows spherical aberration curves, astigmatic field curves and a distortion curve of the imaging lens assembly according to the 11th embodiment. In FIG. 21, the imaging lens assembly includes, in order from an object side to an image side, an aperture stop 1100, a first lens element 1110, a second lens element 1120, a third lens element 1130, a fourth lens element 1140, a fifth lens element 1150, a sixth lens element 1160, an IR-cut filter 1180 and an image plane 1170, wherein the imaging lens assembly has a total of six lens elements with refractive power.

The first lens element 1110 with positive refractive power has a convex object-side surface 1111 and a concave image-side surface 1112. The first lens element 1110 is made of plastic material, and has the object-side surface 1111 and the image-side surface 1112 being both aspheric.

The second lens element 1120 with negative refractive power has a convex object-side surface 1121 and a concave image-side surface 1122. The second lens element 1120 is made of plastic material, and has the object-side surface 1121 and the image-side surface 1122 being both aspheric.

The third lens element 1130 with positive refractive power has a concave object-side surface 1131 and a convex image-side surface 1132. The third lens element 1130 is made of plastic material, and has the object-side surface 1131 and the image-side surface 1132 being both aspheric.

The fourth lens element 1140 with negative refractive power has a concave object-side surface 1141 and a convex image-side surface 1142. The fourth lens element 1140 is made of plastic material, and has the object-side surface 1141 and the image-side surface 1142 being both aspheric.

The fifth lens element 1150 with positive refractive power has a convex object-side surface 1151 and a concave image-side surface 1152, wherein the object-side surface 1151 of the fifth lens element 1150 changes from convex at a paraxial region thereof to concave at a peripheral region thereof. The fifth lens element 1150 is made of plastic material, and has the object-side surface 1151 and the image-side surface 1152 being both aspheric.

The sixth lens element 1160 with positive refractive power has a convex object-side surface 1161 and a concave image-side surface 1162. The sixth lens element 1160 is made of plastic material, and has the object-side surface 1161 and the image-side surface 1162 being both aspheric. Furthermore, the sixth lens element 1160 has inflection points on the object-side surface 1161 and the image-side surface 1162 thereof.

The IR-cut filter 1180 is made of glass material and located between the sixth lens element 1160 and the image plane 1170, and will not affect the focal length of the imaging lens assembly.

The detailed optical data of the 11th embodiment are shown in Table 21 and the aspheric surface data are shown in Table 22 below.

| f (mm) | 3.33 | f/f3 | 1.14 |
|---|---|---|---|
| Fno | 2.08 | f/f6 | 0.07 |
| HFOV (deg.) | 40.8 | f3/f1 | 0.57 |
| (V2 + V4)/V6 | 0.96 | ΣCT/TD | 0.76 |
| CT2/T12 | 1.15 | SD11/SD62 | 0.33 |
| (T56 + CT6)/CT5 | 1.56 | Yc51/Yc62 | 0.72 |
| (R5 + R6)/(R5 − R6) | 1.05 | TL (mm) | 4.75 |
| (R9 + R10)/(R9 − R10) | −2.45 | | |

TABLE 21

11th Embodiment
f = 3.33 mm, Fno = 2.08, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.160 | | | | |
| 2 | Lens 1 | 1.871 | ASP | 0.448 | Plastic | 1.535 | 56.3 | 5.12 |
| 3 | | 5.418 | ASP | 0.213 | | | | |
| 4 | Lens 2 | 2.677 | ASP | 0.245 | Plastic | 1.634 | 23.8 | −13.95 |
| 5 | | 1.982 | ASP | 0.235 | | | | |
| 6 | Lens 3 | −64.388 | ASP | 0.550 | Plastic | 1.530 | 55.8 | 2.92 |
| 7 | | −1.516 | ASP | 0.229 | | | | |
| 8 | Lens 4 | −0.730 | ASP | 0.394 | Plastic | 1.583 | 30.2 | −3.00 |
| 9 | | −1.504 | ASP | 0.057 | | | | |
| 10 | Lens 5 | 2.210 | ASP | 0.409 | Plastic | 1.544 | 55.9 | 6.69 |
| 11 | | 5.257 | ASP | 0.071 | | | | |
| 12 | Lens 6 | 1.198 | ASP | 0.566 | Plastic | 1.535 | 56.3 | 46.06 |
| 13 | | 1.052 | ASP | 0.800 | | | | |
| 14 | IR-cut filter | Plano | | 0.175 | Glass | 1.517 | 64.2 | — |
| 15 | | Plano | | 0.362 | | | | |
| 16 | Image | Plano | | — | | | | |

Note:
Reference wavelength (d-line) is 587.6 nm.

TABLE 22

Aspheric Coefficients

| Surface # | 2 | 3 | 4 | 5 | 6 | 7 |
|---|---|---|---|---|---|---|
| k = | 9.5391E−01 | 1.0000E+01 | −1.7234E+00 | −5.1323E+00 | −5.0000E+01 | −2.8063E+00 |
| A4 = | −1.0613E−02 | −1.0318E−01 | −2.1422E−01 | −7.6902E−02 | −5.2376E−02 | −1.2925E−01 |
| A6 = | −8.3456E−02 | 9.5682E−03 | −4.3294E−01 | −2.1791E−01 | 1.3397E−01 | 5.3618E−02 |
| A8 = | 4.1238E−01 | −5.1426E−02 | 1.5760E+00 | 4.3632E−01 | −5.4119E−01 | 5.2290E−02 |
| A10 = | −1.2333E+00 | −1.9554E−01 | −3.6642E+00 | −5.2062E−01 | 7.3861E−01 | −1.8959E−01 |
| A12 = | 1.6831E+00 | 2.9784E−01 | 4.1735E+00 | 3.0670E−01 | −5.5305E−01 | 1.0953E−01 |
| A14 = | −9.6060E−01 | −2.8253E−01 | −2.1217E+00 | −1.1090E−01 | 1.6841E−01 | −1.6108E−03 |

| Surface # | 8 | 9 | 10 | 11 | 12 | 13 |
|---|---|---|---|---|---|---|
| k = | −1.6325E+00 | −1.1537E+00 | −6.4469E+00 | −9.5202E+00 | −4.0531E+00 | −3.4238E+00 |
| A4 = | 1.4911E−01 | −6.0414E−02 | 8.0293E−02 | 1.8226E−01 | −1.8829E−01 | −1.3061E−01 |
| A6 = | −1.9551E−01 | 1.3872E−01 | −1.3758E−01 | −2.2839E−01 | 6.7981E−02 | 5.5050E−02 |
| A8 = | 4.3287E−01 | −1.1935E−01 | 6.1659E−02 | 1.1753E−01 | −1.0849E−02 | −1.4859E−02 |
| A10 = | −4.5119E−01 | 1.1037E−01 | −1.2164E−02 | −3.6051E−02 | 8.4590E−04 | 2.4766E−03 |
| A12 = | 2.6005E−01 | −5.0220E−02 | −1.8323E−03 | 6.5466E−03 | −3.6197E−05 | −2.5796E−04 |
| A14 = | −7.0026E−02 | 7.9383E−03 | 1.5013E−03 | −5.9415E−04 | 2.7309E−06 | 1.5388E−05 |
| A16 = | | | −2.1127E−04 | 1.7024E−05 | −1.9451E−07 | −4.0562E−07 |

In the imaging lens assembly according to the 11th embodiment, the definitions of these parameters shown in the following table are the same as those stated in the 1st embodiment with corresponding values for the 11th embodiment. Moreover, these parameters can be calculated from Table 21 and Table 22 as the following values and satisfy the following relationships:

12th Embodiment

Figure 23:
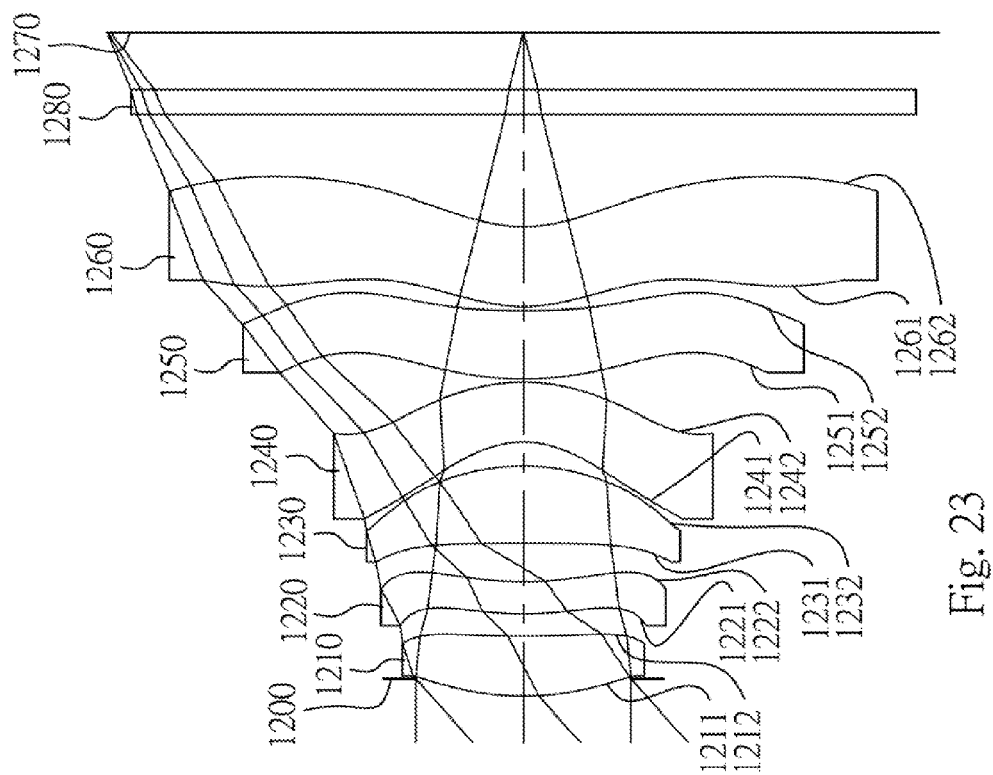
FIG. 23 is a schematic view of an imaging lens assembly according to the 12th embodiment of the present disclosure.
Figure 24:
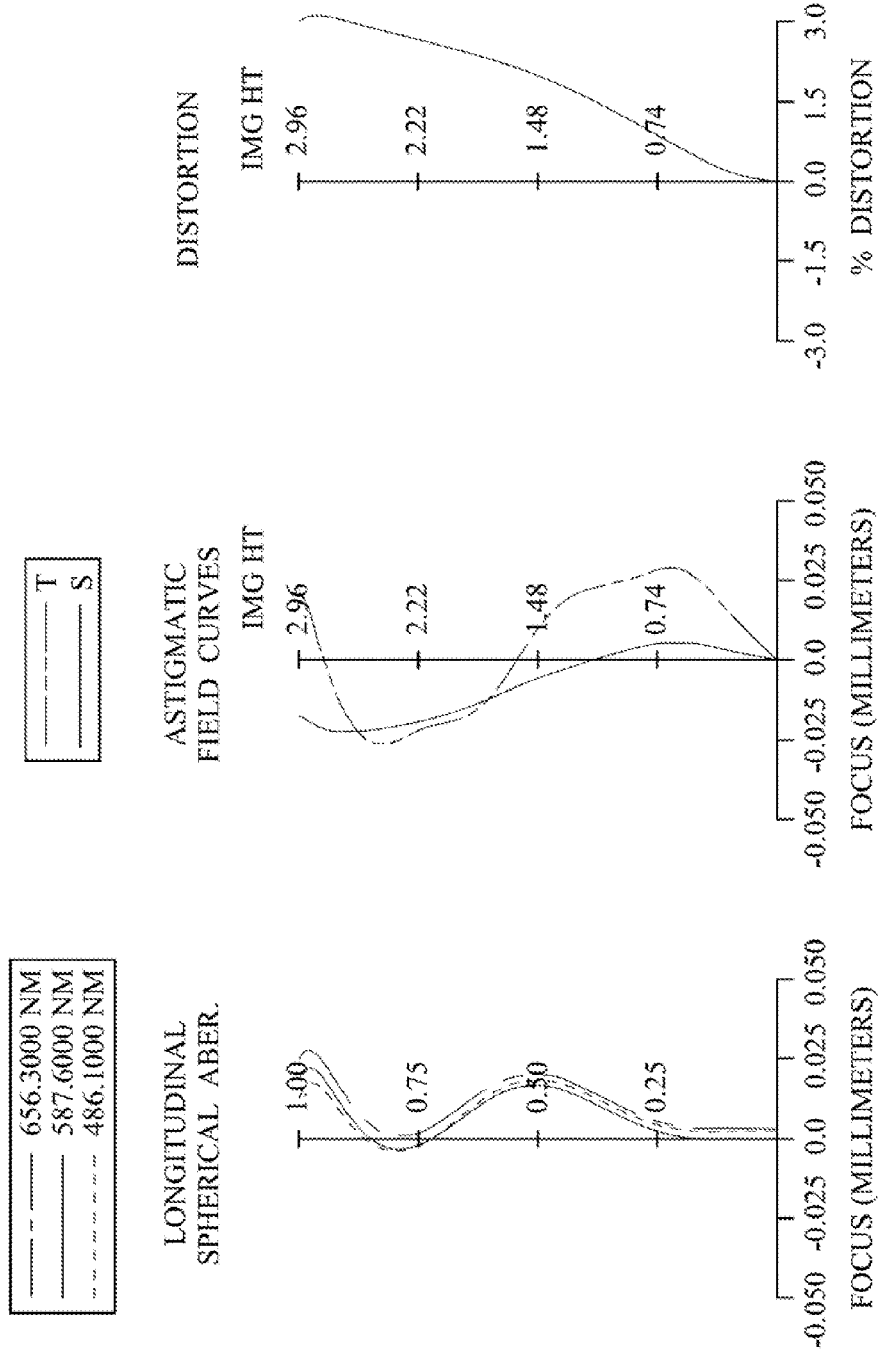
FIG. 24 shows spherical aberration curves, astigmatic field curves and a distortion curve of the imaging lens assembly according to the 12th embodiment.

FIG. 23 is a schematic view of an imaging lens assembly according to the 12th embodiment of the present disclosure. FIG. 24 shows spherical aberration curves, astigmatic field curves and a distortion curve of the imaging lens assembly according to the 12th embodiment. In FIG. 23, the imaging lens assembly includes, in order from an object side to an image side, an aperture stop 1200, a first lens element 1210, a second lens element 1220, a third lens element 1230, a fourth lens element 1240, a fifth lens element 1250, a sixth lens element 1260, an IR-cut filter 1280 and an image plane 1270, wherein the imaging lens assembly has a total of six lens elements with refractive power.

The first lens element 1210 with positive refractive power has a convex object-side surface 1211 and a concave image-side surface 1212. The first lens element 1210 is made of plastic material, and has the object-side surface 1211 and the image-side surface 1212 being both aspheric.

The second lens element 1220 with positive refractive power has a convex object-side surface 1221 and a concave image-side surface 1222. The second lens element 1220 is made of plastic material, and has the object-side surface 1221 and the image-side surface 1222 being both aspheric.

The third lens element 1230 with positive refractive power has a concave object-side surface 1231 and a convex image-side surface 1232. The third lens element 1230 is made of plastic material, and has the object-side surface 1231 and the image-side surface 1232 being both aspheric.

The fourth lens element 1240 with negative refractive power has a concave object-side surface 1241 and a convex image-side surface 1242. The fourth lens element 1240 is made of plastic material, and has the object-side surface 1241 and the image-side surface 1242 being both aspheric.

The fifth lens element 1250 with positive refractive power has a convex object-side surface 1251 and a concave image-side surface 1252, wherein the object-side surface 1251 of the fifth lens element 1250 changes from convex at a paraxial region thereof to concave at a peripheral region thereof. The fifth lens element 1250 is made of plastic material, and has the object-side surface 1251 and the image-side surface 1252 being both aspheric.

The sixth lens element 1260 with positive refractive power has a convex object-side surface 1261 and a concave image-side surface 1262. The sixth lens element 1260 is made of plastic material, and has the object-side surface 1261 and the image-side surface 1262 being both aspheric. Furthermore, the sixth lens element 1260 has inflection points on the object-side surface 1261 and the image-side surface 1262 thereof.

The IR-cut filter 1280 is made of glass material and located between the sixth lens element 1260 and the image plane 1270, and will not affect the focal length of the imaging lens assembly.

The detailed optical data of the 12th embodiment are shown in Table 23 and the aspheric surface data are shown in Table 24 below.

TABLE 23

12th Embodiment
f = 3.19 mm, Fno = 2.08, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.124 | | | | |
| 2 | Lens 1 | 2.028 | ASP | 0.430 | Plastic | 1.535 | 56.3 | 5.75 |
| 3 | | 5.513 | ASP | 0.159 | | | | |
| 4 | Lens 2 | 2.267 | ASP | 0.229 | Plastic | 1.544 | 55.9 | 114.32 |
| 5 | | 2.269 | ASP | 0.275 | | | | |
| 6 | Lens 3 | −38.129 | ASP | 0.550 | Plastic | 1.544 | 55.9 | 3.20 |
| 7 | | −1.673 | ASP | 0.172 | | | | |
| 8 | Lens 4 | −0.692 | ASP | 0.423 | Plastic | 1.650 | 21.4 | −2.64 |
| 9 | | −1.439 | ASP | 0.025 | | | | |
| 10 | Lens 5 | 2.292 | ASP | 0.489 | Plastic | 1.544 | 55.9 | 5.75 |
| 11 | | 7.929 | ASP | 0.025 | | | | |
| 12 | Lens 6 | 1.154 | ASP | 0.574 | Plastic | 1.535 | 56.3 | 23.18 |
| 13 | | 1.051 | ASP | 0.800 | | | | |
| 14 | IR-cut filter | Plano | | 0.175 | Glass | 1.517 | 64.2 | — |
| 15 | | Plano | | 0.409 | | | | |
| 16 | Image | Plano | | — | | | | |

Note:
Reference wavelength (d-line) is 587.6 nm.

TABLE 24

Aspheric Coefficients

| Surface # | 2 | 3 | 4 | 5 | 6 | 7 |
|---|---|---|---|---|---|---|
| k = | 7.5282E−01 | −2.0266E+01 | −1.4295E+00 | −5.0078E+00 | 1.0000E+01 | −3.0416E+00 |
| A4 = | −1.7290E−02 | −1.1678E−01 | −2.1131E−01 | −7.9970E−02 | −6.7619E−02 | −1.3223E−01 |
| A6 = | −8.1298E−02 | −3.8638E−03 | −4.1998E−01 | −2.2816E−01 | 1.4085E−01 | 5.0888E−02 |
| A8 = | 3.9970E−01 | −4.1518E−02 | 1.5620E+00 | 4.3095E−01 | −5.2968E−01 | 5.1927E−02 |
| A10 = | −1.2375E+00 | −2.2334E−01 | −3.7418E+00 | −5.4127E−01 | 7.4268E−01 | −1.8926E−01 |
| A12 = | 1.6808E+00 | 3.1945E−01 | 4.1684E+00 | 3.0660E−01 | −5.5056E−01 | 1.0973E−01 |
| A14 = | −9.8323E−01 | −3.0678E−01 | −2.1307E+00 | −1.0915E−01 | 1.7098E−01 | −1.6160E−03 |

| Surface # | 8 | 9 | 10 | 11 | 12 | 13 |
|---|---|---|---|---|---|---|
| k = | −1.5331E+00 | −1.1480E+00 | −9.2657E+00 | −1.0000E+00 | −3.4524E+00 | −3.3537E+00 |
| A4 = | 1.4144E−01 | −6.0456E−02 | 8.9876E−02 | 1.8450E−01 | −1.9078E−01 | −1.2898E−01 |
| A6 = | −1.9907E−01 | 1.4000E−01 | −1.3674E−01 | −2.2824E−01 | 6.7653E−02 | 5.5422E−02 |

TABLE 24-continued

| Aspheric Coefficients | | | | | |
|---|---|---|---|---|---|
| A8 = | 4.3076E−01 | −1.1823E−01 | 6.1483E−02 | 1.1742E−01 | −1.0832E−02 | −1.4720E−02 |
| A10 = | −4.5144E−01 | 1.1052E−01 | −1.2113E−02 | −3.6076E−02 | 8.5468E−04 | 2.4683E−03 |
| A12 = | 2.6020E−01 | −5.0159E−02 | −1.8553E−03 | 6.5477E−03 | −3.8704E−05 | −2.5749E−04 |
| A14 = | −6.9377E−02 | 7.8723E−03 | 1.4956E−03 | −5.9362E−04 | 2.7240E−06 | 1.5433E−05 |
| A16 = |  |  | −2.1500E−04 | 1.6693E−05 | −2.0499E−07 | −4.1247E−07 |

In the imaging lens assembly according to the 12th embodiment, the definitions of these parameters shown in the following table are the same as those stated in the 1st embodiment with corresponding values for the 12th embodiment. Moreover, these parameters can be calculated from Table 23 and Table 24 as the following values and satisfy the following relationships:

| | | | |
|---|---|---|---|
| f (mm) | 3.19 | f/f3 | 1.00 |
| Fno | 2.08 | f/f6 | 0.14 |
| HFOV (deg.) | 42.0 | f3/f1 | 0.56 |
| (V2 + V4)/V6 | 1.37 | ΣCT/TD | 0.80 |
| CT2/T12 | 1.44 | SD11/SD62 | 0.31 |
| (T56 + CT6)/CT5 | 1.22 | Yc51/Yc62 | 0.69 |
| (R5 + R6)/(R5 − R6) | 1.09 | TL (mm) | 4.73 |
| (R9 + R10)/(R9 − R10) | −1.81 | | |

13th Embodiment

Figure 25:
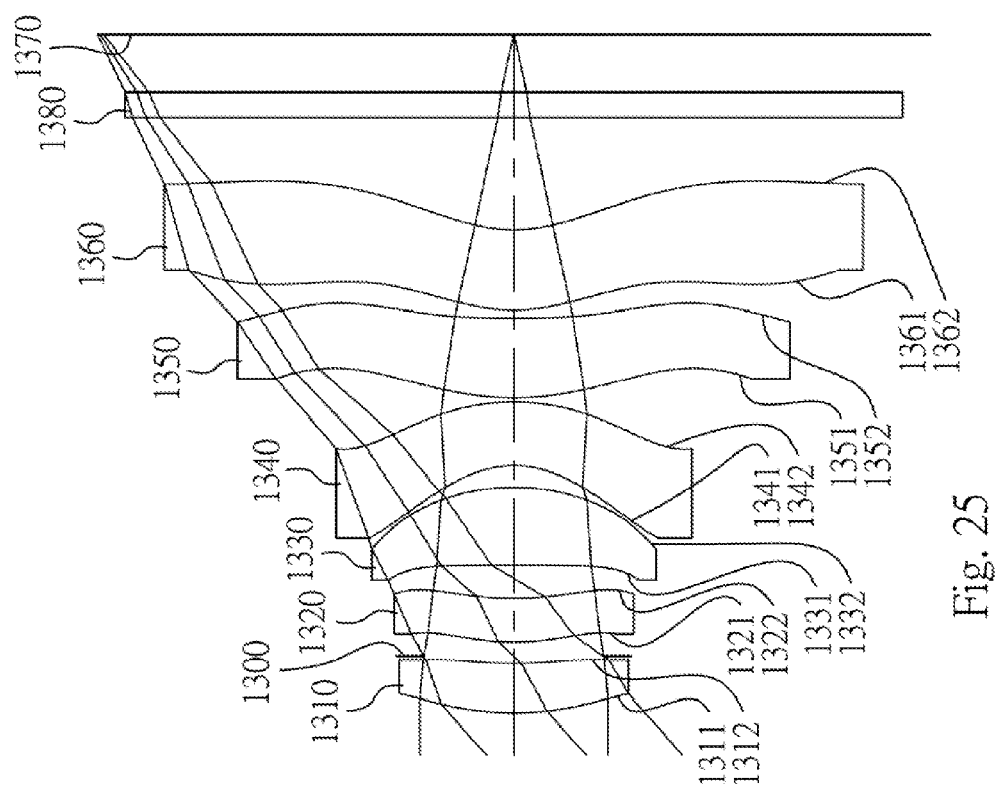
FIG. 25 is a schematic view of an imaging lens assembly according to the 13th embodiment of the present disclosure.
Figure 26:
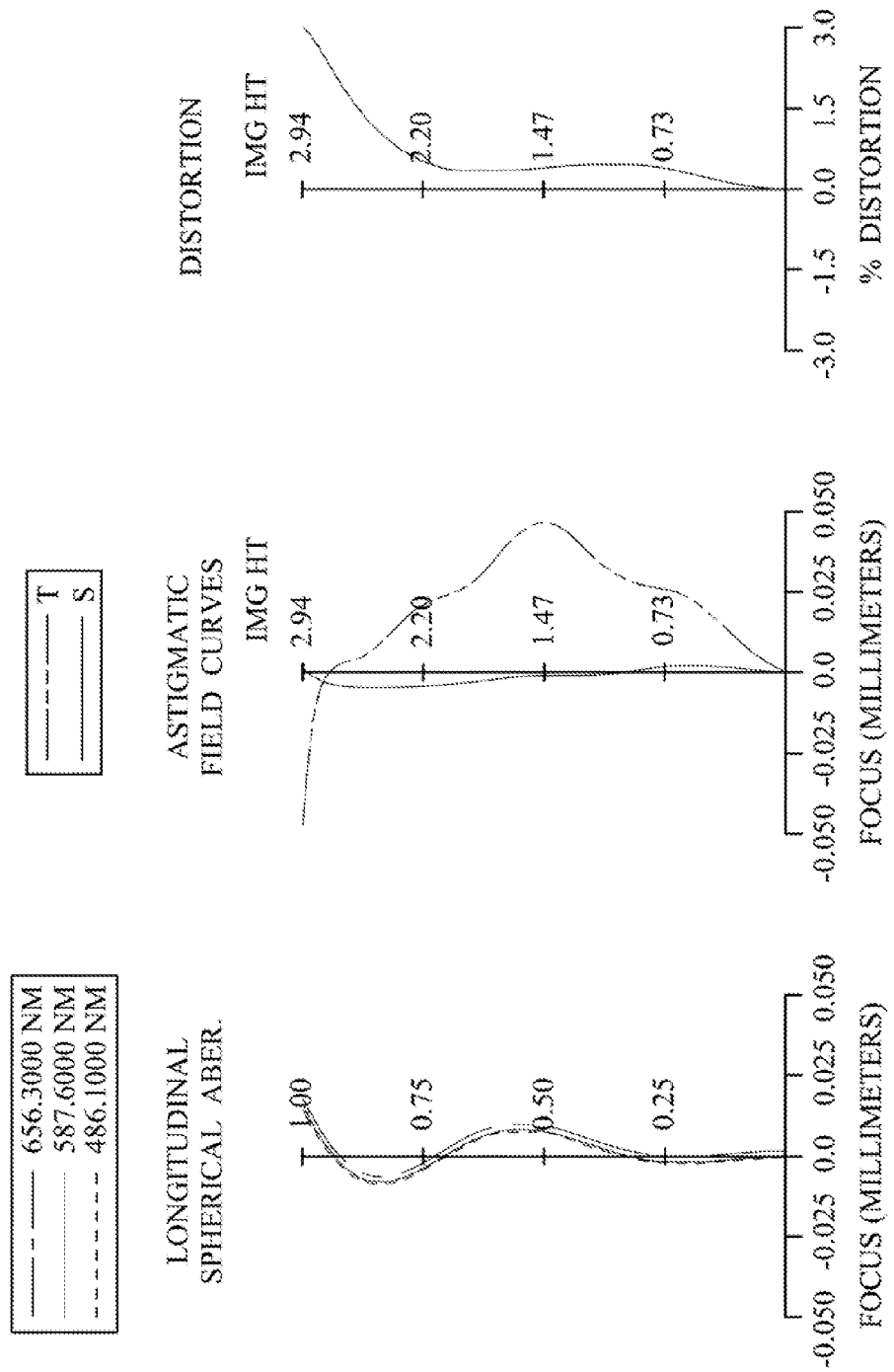
FIG. 26 shows spherical aberration curves, astigmatic field curves and a distortion curve of the imaging lens assembly according to the 13th embodiment.

FIG. 25 is a schematic view of an imaging lens assembly according to the 13th embodiment of the present disclosure. FIG. 26 shows spherical aberration curves, astigmatic field curves and a distortion curve of the imaging lens assembly according to the 13th embodiment. In FIG. 25, the imaging lens assembly includes, in order from an object side to an image side, a first lens element 1310, an aperture stop 1300, a second lens element 1320, a third lens element 1330, a fourth lens element 1340, a fifth lens element 1350, a sixth lens element 1360, an IR-cut filter 1380 and an image plane 1370, wherein the imaging lens assembly has a total of six lens elements with refractive power.

The first lens element 1310 with positive refractive power has a convex object-side surface 1311 and a concave image-side surface 1312. The first lens element 1310 is made of plastic material, and has the object-side surface 1311 and the image-side surface 1312 being both aspheric.

The second lens element 1320 with positive refractive power has a convex object-side surface 1321 and a concave image-side surface 1322. The second lens element 1320 is made of plastic material, and has the object-side surface 1321 and the image-side surface 1322 being both aspheric.

The third lens element 1330 with positive refractive power has a concave object-side surface 1331 and a convex image-side surface 1332. The third lens element 1330 is made of plastic material, and has the object-side surface 1331 and the image-side surface 1332 being both aspheric.

The fourth lens element 1340 with negative refractive power has a concave object-side surface 1341 and a convex image-side surface 1342. The fourth lens element 1340 is made of plastic material, and has the object-side surface 1341 and the image-side surface 1342 being both aspheric.

The fifth lens element 1350 with positive refractive power has a convex object-side surface 1351 and a concave image-side surface 1352, wherein the object-side surface 1351 of the fifth lens element 1350 changes from convex at a paraxial region thereof to concave at a peripheral region thereof. The fifth lens element 1350 is made of plastic material, and has the object-side surface 1351 and the image-side surface 1352 being both aspheric.

The sixth lens element 1360 with positive refractive power has a convex object-side surface 1361 and a concave image-side surface 1362. The sixth lens element 1360 is made of plastic material, and has the object-side surface 1361 and the image-side surface 1362 being both aspheric. Furthermore, the sixth lens element 1360 has inflection points on the object-side surface 1361 and the image-side surface 1362 thereof.

The IR-cut filter 1380 is made of glass material and located between the sixth lens element 1360 and the image plane 1370, and will not affect the focal length of the imaging lens assembly.

The detailed optical data of the 13th embodiment are shown in Table 25 and the aspheric surface data are shown in Table 26 below.

TABLE 25

13th Embodiment
f = 3.21 mm, Fno = 2.40, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.137 | ASP | 0.352 | Plastic | 1.530 | 55.8 | 10.72 |
| 2 | | 3.230 | ASP | 0.050 | | | | |
| 3 | Ape. Stop | Plano | | 0.102 | | | | |
| 4 | Lens 2 | 1.660 | ASP | 0.312 | Plastic | 1.544 | 55.9 | 10.52 |
| 5 | | 2.183 | ASP | 0.237 | | | | |
| 6 | Lens 3 | −90.781 | ASP | 0.550 | Plastic | 1.514 | 56.8 | 3.18 |
| 7 | | −1.608 | ASP | 0.160 | | | | |
| 8 | Lens 4 | −0.683 | ASP | 0.448 | Plastic | 1.634 | 23.8 | −2.35 |
| 9 | | −1.586 | ASP | 0.030 | | | | |
| 10 | Lens 5 | 2.024 | ASP | 0.588 | Plastic | 1.544 | 55.9 | 4.28 |
| 11 | | 13.863 | ASP | 0.056 | | | | |
| 12 | Lens 6 | 1.231 | ASP | 0.574 | Plastic | 1.535 | 56.3 | 88.74 |
| 13 | | 1.059 | ASP | 0.800 | | | | |

TABLE 25-continued

13th Embodiment
f = 3.21 mm, Fno = 2.40, HFOV = 41.6 deg.

| Surface # | | Curvature Radius | Thickness | Material | Index | Abbe # | Focal Length |
|---|---|---|---|---|---|---|---|
| 14 | IR-cut filter | Plano | 0.175 | Glass | 1.517 | 64.2 | — |
| 15 | | Plano | 0.413 | | | | |
| 16 | Image | Plano | — | | | | |

Note:
Reference wavelength (d-line) is 587.6 nm.

TABLE 26

Aspheric Coefficients

| Surface # | 1 | 2 | 4 | 5 | 6 | 7 |
|---|---|---|---|---|---|---|
| k = | 3.2369E−01 | −3.3014E+01 | −2.2862E+00 | −2.9650E+00 | −5.0000E+01 | −2.2371E+00 |
| A4 = | −2.9816E−02 | −1.2661E−01 | −2.2429E−01 | −8.2795E−02 | −7.6276E−02 | −1.4585E−01 |
| A6 = | −4.6453E−02 | −1.8818E−03 | −3.6710E−01 | −3.2066E−01 | 1.1291E−01 | 4.1876E−02 |
| A8 = | 3.5134E−01 | −1.9090E−02 | 1.3986E+00 | 3.7469E−01 | −5.5344E−01 | 4.5166E−02 |
| A10 = | −1.2217E+00 | −2.5812E−01 | −3.6262E+00 | −4.9542E−01 | 6.7282E−01 | −1.9128E−01 |
| A12 = | 1.6808E+00 | 3.1945E−01 | 4.1684E+00 | 3.0660E−01 | −5.5056E−01 | 1.0973E−01 |
| A14 = | −9.8323E−01 | −3.0678E−01 | −2.1307E+00 | −1.0915E−01 | 1.7098E−01 | −1.6160E−03 |

| Surface # | 8 | 9 | 10 | 11 | 12 | 13 |
|---|---|---|---|---|---|---|
| k = | −1.4784E+00 | −1.0308E+00 | −1.1104E+01 | −2.9042E+00 | −2.8445E+00 | −3.3154E+00 |
| A4 = | 1.2768E−01 | −6.3785E−02 | 9.3463E−02 | 1.9215E−01 | −1.9279E−01 | −1.3123E−01 |
| A6 = | −2.1022E−01 | 1.3933E−01 | −1.3403E−01 | −2.2691E−01 | 6.7919E−02 | 5.5450E−02 |
| A8 = | 4.3008E−01 | −1.1875E−01 | 6.1669E−02 | 1.1744E−01 | −1.0788E−02 | −1.4629E−02 |
| A10 = | −4.4507E−01 | 1.1084E−01 | −1.2108E−02 | −3.6091E−02 | 8.5287E−04 | 2.4698E−03 |
| A12 = | 2.6851E−01 | −4.9706E−02 | −1.8768E−03 | 6.5417E−03 | −3.7098E−05 | −2.5770E−04 |
| A14 = | −6.9377E−02 | 7.9748E−03 | 1.4852E−03 | −5.9420E−04 | 2.7931E−06 | 1.5502E−05 |
| A16 = | | | −2.1612E−04 | 1.6736E−05 | −2.0701E−07 | −4.2195E−07 |

In the imaging lens assembly according to the 13th embodiment, the definitions of these parameters shown in the following table are the same as those stated in the 1st embodiment with corresponding values for the 13th embodiment. Moreover, these parameters can be calculated from Table 25 and Table 26 as the following values and satisfy the following relationships:

| | | | |
|---|---|---|---|
| f (mm) | 3.21 | f/f3 | 1.01 |
| Fno | 2.40 | f/f6 | 0.04 |
| HFOV (deg.) | 41.6 | f3/f1 | 0.30 |
| (V2 + V4)/V6 | 1.42 | ΣCT/TD | 0.82 |
| CT2/T12 | 2.05 | SD11/SD62 | 0.33 |
| (T56 + CT6)/CT5 | 1.11 | Yc51/Yc62 | 0.72; 0.53 |
| (R5 + R6)/(R5 − R6) | 1.04 | TL (mm) | 4.83 |
| (R9 + R10)/(R9 − R10) | −1.34 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An imaging lens assembly comprising, in order from an object side to an image side:
a first lens element with positive refractive power having a convex object-side surface;
a second lens element with refractive power;
a third lens element with positive refractive power;
a fourth lens element with negative refractive power having a concave object-side surface and a convex image-side surface;
to a fifth lens element with positive refractive power having a convex object-side surface, wherein the object-side surface and an image-side surface of the fifth lens element are aspheric; and
a sixth lens element with refractive power having a convex object-side surface and a concave image-side surface, wherein the object-side surface and the image-side surface of the sixth lens element are aspheric, and the sixth lens element has at least one inflection point on at least one of the object-side surface and the image-side surface thereof;
wherein the imaging lens assembly has a total of six lens elements with refractive power, a curvature radius of the object-side surface of the fifth lens element is R9, a curvature radius of the image-side surface of the fifth lens element is R10, an axial distance between the fifth lens element and the sixth lens element is T56, a central thickness of the fifth lens element is CT5, a central thickness of the sixth lens element is CT6, and the following relationships are satisfied:

−3.0<(R9+R10)/(R9−R10)<0.30; and

0<(T56+CT6)/CT5<3.0.

2. The imaging lens assembly of claim 1, wherein the third lens element has a convex image-side surface.

3. The imaging lens assembly of claim 2, wherein the first lens element has a concave image-side surface.

4. The imaging lens assembly of claim 2, wherein the second lens element has a concave image-side surface.

5. The imaging lens assembly of claim 4, wherein the second lens element has a convex object-side surface.

6. The imaging lens assembly of claim 4, wherein a focal length of the imaging lens assembly is f, a focal length of the sixth lens element is f6, and the following relationship is satisfied:

$-0.7 < f/f6 < 0.5$.

7. The imaging lens assembly of claim 4, wherein an f-number of the imaging lens assembly is Fno, and the following relationship is satisfied:

$1.2 < Fno < 2.5$.

8. The imaging lens assembly of claim 4, wherein a maximum effective radius of the object-side surface of the first lens element is SD11, a maximum effective radius of the image-side surface of the sixth lens element is SD62, and the following relationship is satisfied:

$0.20 < SD11/SD62 < 0.45$.

9. The imaging lens assembly of claim 1, wherein the curvature radius of the object-side surface of the fifth lens element is R9, the curvature radius of the image-side surface of the fifth lens element is R10, and the following relationship is satisfied:

$-2.5 < (R9+R10)/(R9-R10) < 0$.

10. The imaging lens assembly of claim 9, wherein a focal length of the first lens element is f1, a focal length of the third lens element is f3, and the following relationship is satisfied:

$0 < f3/f1 < 1.0$.

11. The imaging lens assembly of claim 9, wherein an Abbe number of the second lens element is V2, an Abbe number of the fourth lens element is V4, an Abbe number of the sixth lens element is V6, and the following relationship is satisfied:

$0.70 < (V2+V4)/V6 < 1.00$.

12. The imaging lens assembly of claim 9, wherein a half of a maximal field of view of the imaging lens assembly is HFOV, and the following relationship is satisfied:

35 degrees $< HFOV <$ 50 degrees.

13. The imaging lens assembly of claim 9, wherein a curvature radius of an object-side surface of the third lens element is R5, a curvature radius of an image-side surface of the third lens element is R6, and the following relationship is satisfied:

$0.6 < (R5+R6)/(R5-R6) < 1.5$.

14. The imaging lens assembly of claim 9, wherein the object-side surface of the fifth lens element changes from convex at a paraxial region thereof to concave at a peripheral region thereof.

15. The imaging lens assembly of claim 1, wherein the axial distance to between the fifth lens element and the sixth lens element is T56, the central thickness of the fifth lens element is CT5, the central thickness of the sixth lens element is CT6, and the following relationship is satisfied:

$0.3 < (T56+CT6)/CT5 < 2.0$.

16. The imaging lens assembly of claim 15, wherein the first lens element, the second lens element, the third lens element, the fourth lens element, the fifth lens element and the sixth lens element are made of plastic material.

17. The imaging lens assembly of claim 15, wherein the axial distance between the fifth lens element and the sixth lens element is T56, the central thickness of the fifth lens element is CT5, the central thickness of the sixth lens element is CT6, and the following relationship is satisfied:

$0.5 < (T56+CT6)/CT5 < 1.7$.

18. The imaging lens assembly of claim 15, wherein a central thickness of the second lens element is CT2, an axial distance between the first lens element and the second lens element is T12, and the following relationship is satisfied:

$0.4 < CT2/T12 < 2.0$.

19. The imaging lens assembly of claim 15, wherein a focal length of the imaging lens assembly is f, a focal length of the third lens element is f3, and the following relationship is satisfied:

$0.8 < f/f3 < 1.5$.

20. The imaging lens assembly of claim 15, wherein a vertical distance between a non-axial critical point on the object-side surface of the fifth lens element and an optical axis is Yc51, a vertical distance between a non-axial critical point on the image-side surface of the sixth lens element and the optical axis is Yc62, and the following relationship is satisfied:

$0.5 < Yc51/Yc62 < 1.1$.

21. The imaging lens assembly of claim 1, wherein a sum of central thicknesses of the first lens element, the second lens element, the third lens element, the fourth lens element, the fifth lens element and the sixth lens element is $\Sigma CT$, an axial distance between the object-side surface of the first lens element and the image-side surface of the sixth lens element is TD, and the following relationship is satisfied:

$0.75 < \Sigma CT/TD < 0.90$.

22. The imaging lens assembly of claim 1, wherein an axial distance between the object-side surface of the first lens element and an image plane is TL, and the following relationship is satisfied:

3.0 mm $<$ TL $<$ 5.0 mm.

* * * * *

UNITED STATES PATENT AND TRADEMARK OFFICE
CERTIFICATE OF CORRECTION

PATENT NO.        : 8,830,594 B1
APPLICATION NO.   : 13/854128
DATED             : September 9, 2014
INVENTOR(S)       : Po-Lun Hsu et al.

Page 1 of 1

It is certified that error appears in the above-identified patent and that said Letters Patent is hereby corrected as shown below:

In the Claims (1) In column 42, line 39, Claim 1 of the issued patent reads as "to a fifth lens element with positive refractive power", but it should read as "a fifth lens element with positive refractive power".
(2) In column 44, line 2, Claim 15 of the issued patent reads as "axial distance to between the fifth lens element", but it should read as "axial distance between the fifth lens element".

Signed and Sealed this
Thirtieth Day of December, 2014

Michelle K. Lee
*Deputy Director of the United States Patent and Trademark Office*